United States Patent
Ochsendorf et al.

(10) Patent No.: US 10,161,746 B2
(45) Date of Patent: Dec. 25, 2018

(54) SYSTEMS AND METHODS FOR CARGO MANAGEMENT

(71) Applicant: Trimble Navigation Limited, Sunnyvale, CA (US)

(72) Inventors: Ricky L. Ochsendorf, Prior Lake, MN (US); Michael D. Nalepka, Franklin, TN (US)

(73) Assignee: Trimble Navigation Limited, Sunnyvale, CA (US)

( * ) Notice: Subject to any disclaimer, the term of this patent is extended or adjusted under 35 U.S.C. 154(b) by 250 days.

(21) Appl. No.: 14/829,287

(22) Filed: Aug. 18, 2015

(65) Prior Publication Data

US 2016/0047646 A1    Feb. 18, 2016

Related U.S. Application Data

(60) Provisional application No. 62/038,706, filed on Aug. 18, 2014.

(51) Int. Cl.
  *G01B 11/28*  (2006.01)
  *G01C 21/34*  (2006.01)
(52) U.S. Cl.
  CPC ............ *G01B 11/28* (2013.01); *G01C 21/343* (2013.01)
(58) Field of Classification Search
  CPC ...................................................... G01B 11/28
  See application file for complete search history.

(56) References Cited

U.S. PATENT DOCUMENTS

| | | |
|---|---|---|
| 2,978,971 A | 4/1961 | Eburn, Jr. |
| 3,528,524 A | 9/1970 | Birbanescu et al. |
| 3,689,695 A | 9/1972 | Rosenfield et al. |
| 4,023,507 A | 5/1977 | Van Der Lely |
| 4,110,792 A | 8/1978 | Long et al. |
| RE30,539 E | 3/1981 | Van der Lely |
| 4,277,804 A | 7/1981 | Robison |
| 4,365,268 A | 12/1982 | Allen et al. |
| 4,555,725 A | 11/1985 | Geiersbach et al. |
| 4,776,750 A | 10/1988 | Griswold, Jr. et al. |
| 4,892,345 A | 1/1990 | Rachael |
| 5,015,189 A | 5/1991 | Wenzinger, Jr. |
| 5,090,804 A | 2/1992 | Wong et al. |
| 5,191,370 A | 3/1993 | Bozzolato |
| 5,289,321 A | 2/1994 | Secor |
| 5,331,118 A * | 7/1994 | Jensen ................ G01B 11/00 177/245 |
| 5,429,329 A | 7/1995 | Wallace et al. |
| 5,517,419 A | 5/1996 | Lanckton et al. |
| 5,530,421 A | 6/1996 | Marshall et al. |

(Continued)

OTHER PUBLICATIONS

Axiomatic Global Electronic Solutions, "What is SAE J1939," www.axiomatic.com, Jul. 2006, 3 pages.

(Continued)

*Primary Examiner* — Chikaodili E Anyikire
(74) *Attorney, Agent, or Firm* — Hollingsworth Davis, LLC

(57) ABSTRACT

A system for use with a vehicle comprising a tractor and a trailer includes one or more image capture devices. The one or more image capture devices capture images of the interior of a trailer and/or cargo items of the trailer. An image processor estimates available cargo space within the trailer based on the captured images.

21 Claims, 19 Drawing Sheets

(56) References Cited

U.S. PATENT DOCUMENTS

| | | | |
|---|---|---|---|
| 5,637,871 A | 6/1997 | Piety et al. | |
| 5,956,079 A | 9/1999 | Ridgley | |
| 5,995,900 A | 11/1999 | Hsiao et al. | |
| 6,133,851 A | 10/2000 | Johnson | |
| 6,148,255 A | 11/2000 | Van der Lely | |
| 6,148,291 A * | 11/2000 | Radican | G06Q 10/08 705/22 |
| 6,259,475 B1 | 7/2001 | Ramachandran et al. | |
| 6,288,362 B1 | 9/2001 | Thomas et al. | |
| 6,426,704 B1 | 7/2002 | Hutchison | |
| 6,433,683 B1 | 8/2002 | Robinson | |
| 6,434,450 B1 | 8/2002 | Griffin, Jr. et al. | |
| 6,491,417 B1 | 12/2002 | Haen et al. | |
| 6,578,675 B2 | 6/2003 | Wilson et al. | |
| 6,690,413 B1 | 2/2004 | Moore | |
| 6,693,519 B2 | 2/2004 | Keirstead | |
| 6,750,898 B1 | 6/2004 | Ishida et al. | |
| 6,783,187 B2 | 8/2004 | Parsons | |
| 6,927,694 B1 | 8/2005 | Smith et al. | |
| 6,933,837 B2 | 8/2005 | Gunderson et al. | |
| 6,970,772 B2 | 11/2005 | Radtke et al. | |
| 7,006,129 B1 | 2/2006 | McClure | |
| 7,102,665 B1 | 9/2006 | Chandler et al. | |
| 7,142,098 B2 | 11/2006 | Lang et al. | |
| 7,164,476 B2 | 1/2007 | Shima et al. | |
| 7,171,769 B2 | 2/2007 | Schultz et al. | |
| 7,176,958 B2 | 2/2007 | Jones | |
| 7,184,074 B1 | 2/2007 | Jansen | |
| 7,193,508 B2 | 3/2007 | Hill et al. | |
| 7,195,267 B1 | 3/2007 | Thompson | |
| 7,204,504 B2 | 4/2007 | Gehring et al. | |
| 7,265,663 B2 | 9/2007 | Steele | |
| 7,280,042 B2 | 10/2007 | Trela | |
| 7,306,398 B2 | 12/2007 | Doran, Jr. | |
| 7,325,328 B1 * | 2/2008 | Morton | B63B 49/00 33/713 |
| 7,342,486 B2 | 3/2008 | Tsukada et al. | |
| 7,344,109 B1 | 3/2008 | Rezai | |
| 7,358,851 B2 | 4/2008 | Patenaude et al. | |
| 7,400,957 B2 | 7/2008 | Hofer et al. | |
| 7,434,643 B2 | 10/2008 | Lesesky et al. | |
| 7,536,457 B2 | 5/2009 | Miller | |
| 7,565,941 B2 | 7/2009 | Cunningham | |
| 7,659,827 B2 | 2/2010 | Gunderson et al. | |
| 7,660,433 B2 | 2/2010 | Dralle et al. | |
| 7,725,216 B2 | 5/2010 | Kim | |
| 7,804,426 B2 | 9/2010 | Etcheson | |
| 7,825,951 B2 | 11/2010 | Lang et al. | |
| 7,880,609 B2 | 2/2011 | Viegers et al. | |
| 7,922,085 B2 | 4/2011 | Thomas et al. | |
| 7,974,444 B2 | 7/2011 | Hongo | |
| 8,000,843 B2 | 8/2011 | Kim | |
| 8,004,112 B2 | 8/2011 | Koga et al. | |
| 8,009,034 B2 | 8/2011 | Dobson et al. | |
| 8,046,414 B2 | 10/2011 | Kamdar et al. | |
| 8,120,653 B2 | 2/2012 | Schmidt et al. | |
| 8,126,309 B2 | 2/2012 | Sakai | |
| 8,139,820 B2 | 3/2012 | Plante et al. | |
| 8,181,868 B2 | 5/2012 | Thomas et al. | |
| 8,198,991 B2 | 6/2012 | Do | |
| 8,199,975 B2 | 6/2012 | Pomerleau et al. | |
| 8,232,871 B2 | 7/2012 | Lesesky | |
| 8,239,092 B2 | 8/2012 | Plante et al. | |
| 8,262,120 B1 | 9/2012 | Pitts et al. | |
| 8,269,617 B2 | 9/2012 | Cook et al. | |
| 8,276,322 B2 | 10/2012 | Miller | |
| 8,314,708 B2 | 11/2012 | Gunderson et al. | |
| 8,330,817 B1 | 12/2012 | Foster | |
| 8,342,597 B2 | 1/2013 | Nagami et al. | |
| 8,373,567 B2 | 2/2013 | Denson | |
| 8,374,746 B2 | 2/2013 | Plante | |
| 8,427,288 B2 | 4/2013 | Schofield et al. | |
| 8,500,383 B2 | 8/2013 | Schmidgall | |
| 8,508,353 B2 | 8/2013 | Cook et al. | |
| 8,564,446 B2 | 10/2013 | Gunderson et al. | |
| 8,564,658 B2 | 10/2013 | Nimberger | |
| 8,583,314 B2 | 11/2013 | de Oliveira et al. | |
| 8,606,492 B1 | 12/2013 | Botnen | |
| 8,626,568 B2 | 1/2014 | Warkentin et al. | |
| 8,649,933 B2 | 2/2014 | Plante et al. | |
| 8,670,035 B2 | 3/2014 | Robert | |
| 8,676,491 B2 | 3/2014 | Taylor et al. | |
| 8,680,976 B2 | 3/2014 | Lesesky | |
| 8,725,345 B2 | 5/2014 | De Oliveira et al. | |
| 8,744,642 B2 | 6/2014 | Nemat-Nasser et al. | |
| 8,757,084 B2 | 6/2014 | Condit et al. | |
| 8,849,501 B2 | 9/2014 | Cook et al. | |
| 8,854,199 B2 | 10/2014 | Cook et al. | |
| 8,880,279 B2 | 11/2014 | Plante | |
| 8,892,310 B1 | 11/2014 | Palmer et al. | |
| 8,930,072 B1 | 1/2015 | Lambert et al. | |
| 8,952,819 B2 | 2/2015 | Nemat-Nasser | |
| 2002/0066621 A1 | 6/2002 | Wilson et al. | |
| 2002/0080016 A1 | 6/2002 | Keirstead | |
| 2002/0130065 A1 * | 9/2002 | Bloom | B07C 3/00 209/630 |
| 2002/0191407 A1 | 12/2002 | Haen et al. | |
| 2003/0028298 A1 | 2/2003 | Macky et al. | |
| 2003/0141965 A1 | 7/2003 | Gunderson et al. | |
| 2003/0234512 A1 | 12/2003 | Holub | |
| 2004/0021858 A1 | 2/2004 | Shima et al. | |
| 2004/0041942 A1 | 3/2004 | Jones | |
| 2004/0080206 A1 | 4/2004 | Parsons | |
| 2004/0088090 A1 | 5/2004 | Wee | |
| 2004/0196366 A1 | 10/2004 | Thiel | |
| 2004/0212489 A1 | 10/2004 | Chan | |
| 2005/0015805 A1 | 1/2005 | Iwamura | |
| 2005/0065682 A1 * | 3/2005 | Kapadia | G07C 5/008 701/36 |
| 2005/0102079 A1 | 5/2005 | Hofer et al. | |
| 2005/0146607 A1 | 7/2005 | Linn et al. | |
| 2005/0151845 A1 | 7/2005 | Tsukada et al. | |
| 2005/0162513 A1 | 7/2005 | Chan | |
| 2005/0193603 A1 | 9/2005 | Schultz et al. | |
| 2005/0216294 A1 | 9/2005 | Labow | |
| 2005/0219359 A1 | 10/2005 | Trela | |
| 2005/0230163 A1 | 10/2005 | Cunningham | |
| 2005/0242931 A1 | 11/2005 | Gunderson et al. | |
| 2006/0061656 A1 | 3/2006 | Lang et al. | |
| 2006/0092403 A1 | 5/2006 | Dralle et al. | |
| 2006/0098094 A1 | 5/2006 | Lott | |
| 2006/0147264 A1 | 7/2006 | Doran | |
| 2006/0251502 A1 | 11/2006 | Scharfenberger | |
| 2007/0040677 A1 * | 2/2007 | Blair, Jr. | G06Q 10/08 340/568.1 |
| 2007/0120953 A1 | 5/2007 | Koga et al. | |
| 2007/0132773 A1 | 6/2007 | Plante | |
| 2007/0135979 A1 | 6/2007 | Plante | |
| 2007/0135980 A1 | 6/2007 | Plante | |
| 2007/0136078 A1 | 6/2007 | Plante | |
| 2007/0139182 A1 | 6/2007 | O'Connor et al. | |
| 2007/0150373 A1 | 6/2007 | Kuo | |
| 2007/0174624 A1 | 7/2007 | Wolosewicz et al. | |
| 2007/0268158 A1 | 11/2007 | Gunderson et al. | |
| 2007/0271105 A1 | 11/2007 | Gunderson et al. | |
| 2008/0043736 A1 | 2/2008 | Stanley | |
| 2008/0044061 A1 | 2/2008 | Hongo | |
| 2008/0049830 A1 | 2/2008 | Richardson | |
| 2008/0111666 A1 | 5/2008 | Plante et al. | |
| 2008/0122603 A1 | 5/2008 | Plante et al. | |
| 2008/0147267 A1 | 6/2008 | Plante et al. | |
| 2008/0158352 A1 | 7/2008 | Schmidt et al. | |
| 2008/0252417 A1 | 10/2008 | Thomas et al. | |
| 2008/0304705 A1 | 12/2008 | Pomerleau et al. | |
| 2008/0319602 A1 | 12/2008 | McClellan et al. | |
| 2009/0057069 A1 | 3/2009 | Boggess | |
| 2009/0102923 A1 | 4/2009 | Mason | |
| 2009/0112510 A1 * | 4/2009 | Crane | G01B 21/18 702/166 |
| 2009/0192638 A1 | 7/2009 | Leest et al. | |
| 2009/0299805 A1 | 12/2009 | Baughman et al. | |
| 2009/0309468 A1 | 12/2009 | Miller | |
| 2009/0319341 A1 | 12/2009 | Berkobin et al. | |
| 2010/0049994 A1 | 2/2010 | Ghoshal | |

(56) References Cited

U.S. PATENT DOCUMENTS

| | | |
|---|---|---|
| 2010/0073473 A1 | 3/2010 | Nimberger |
| 2010/0073476 A1* | 3/2010 | Liang .................. G06Q 10/08 348/136 |
| 2010/0085171 A1 | 4/2010 | Do |
| 2010/0157061 A1 | 6/2010 | Katsman et al. |
| 2010/0171828 A1 | 7/2010 | Ishii |
| 2010/0194976 A1 | 8/2010 | Smith et al. |
| 2010/0207744 A1 | 8/2010 | Lammers et al. |
| 2010/0225738 A1 | 9/2010 | Webster |
| 2011/0035777 A1 | 2/2011 | Chae et al. |
| 2011/0096166 A1 | 4/2011 | Englander et al. |
| 2011/0149077 A1 | 6/2011 | Robert |
| 2011/0163159 A1 | 7/2011 | Thomas et al. |
| 2011/0295446 A1 | 12/2011 | Basir et al. |
| 2012/0030041 A1 | 2/2012 | Wolosewicz et al. |
| 2012/0034056 A1 | 2/2012 | Schmidgall |
| 2012/0062741 A1 | 3/2012 | Stimel et al. |
| 2012/0095935 A1 | 4/2012 | Mowat et al. |
| 2012/0146361 A1 | 6/2012 | Nagami et al. |
| 2012/0181878 A1 | 7/2012 | Nosaka et al. |
| 2012/0201312 A1 | 8/2012 | Schwager |
| 2012/0277950 A1 | 11/2012 | Plante et al. |
| 2012/0318187 A1 | 12/2012 | Condit et al. |
| 2012/0330597 A1 | 12/2012 | Lammers |
| 2013/0021148 A1 | 1/2013 | Cook et al. |
| 2013/0024060 A1 | 1/2013 | Sukkarie et al. |
| 2013/0033381 A1* | 2/2013 | Breed .................. B60T 1/005 340/568.1 |
| 2013/0069390 A1 | 3/2013 | Foster |
| 2013/0096731 A1 | 4/2013 | Tamari et al. |
| 2013/0107044 A1 | 5/2013 | Azevedo |
| 2013/0169425 A1 | 7/2013 | Victor et al. |
| 2013/0188050 A1 | 7/2013 | Winget |
| 2013/0197774 A1 | 8/2013 | Denson |
| 2013/0233448 A1 | 9/2013 | Schrubbe et al. |
| 2013/0274950 A1 | 10/2013 | Richardson et al. |
| 2013/0317711 A1 | 11/2013 | Plante |
| 2013/0332004 A1 | 12/2013 | Gompert et al. |
| 2013/0342653 A1* | 12/2013 | McCloskey .......... G01S 17/026 348/46 |
| 2013/0345927 A1 | 12/2013 | Cook et al. |
| 2014/0015977 A1 | 1/2014 | Taylor et al. |
| 2014/0025254 A1 | 1/2014 | Plante et al. |
| 2014/0036072 A1* | 2/2014 | Lyall .................. G06K 9/00771 348/143 |
| 2014/0046550 A1 | 2/2014 | Palmer et al. |
| 2014/0046569 A1 | 2/2014 | Mohn et al. |
| 2014/0047371 A1 | 2/2014 | Palmer et al. |
| 2014/0058616 A1 | 2/2014 | de Oliveira |
| 2014/0088824 A1 | 3/2014 | Ishimoto |
| 2014/0094992 A1 | 4/2014 | Lambert et al. |
| 2014/0139655 A1 | 5/2014 | Mimar |
| 2014/0152422 A1* | 6/2014 | Breed .................. G06K 9/00369 340/5.52 |
| 2014/0152828 A1 | 6/2014 | Plante et al. |
| 2014/0167945 A1 | 6/2014 | Cook et al. |
| 2014/0195105 A1 | 7/2014 | Lambert |
| 2015/0352721 A1* | 12/2015 | Wicks .................. B25J 9/1664 700/228 |

OTHER PUBLICATIONS

Britell et al., "Collision Avoidance Through Improved Communication Between Tractor and Trailer," Federal Register, vol. 59, No. 170, Sep. 2, 1994, pp. 45750-45752.

Corrigan, "Introduction to the Controller Area Network (CAN)," Application Report SLOA101A, Texas Instruments, Aug. 2002, 15 pages.

Fleet Camera Systems Fleet Safety, "In Vehicle Camera," www.safetytrackcam.com, printed on Jul. 16, 2014, 2 pages.

Junger, "Introduction to J1939," Vector Informatik GmbH, Application Note AN-ION-1-3100, www.vector.com, Apr. 27, 2010, 11 pages.

Lin et al., "Evaluation of the Power Line Motor Carrier Rearview Video System," State of Florida Department of Transportation, Jun. 2009, 147 pages.

Maryanka, "Using Power Line Communication for Harness Reduction in Automotive," Yamar Electronics Ltd, www.yamar.com, 2011, 4 pages.

SAE International, "Surface Vehicle Recommended Practice," www.sae.org, 2004, 16 pages.

* cited by examiner

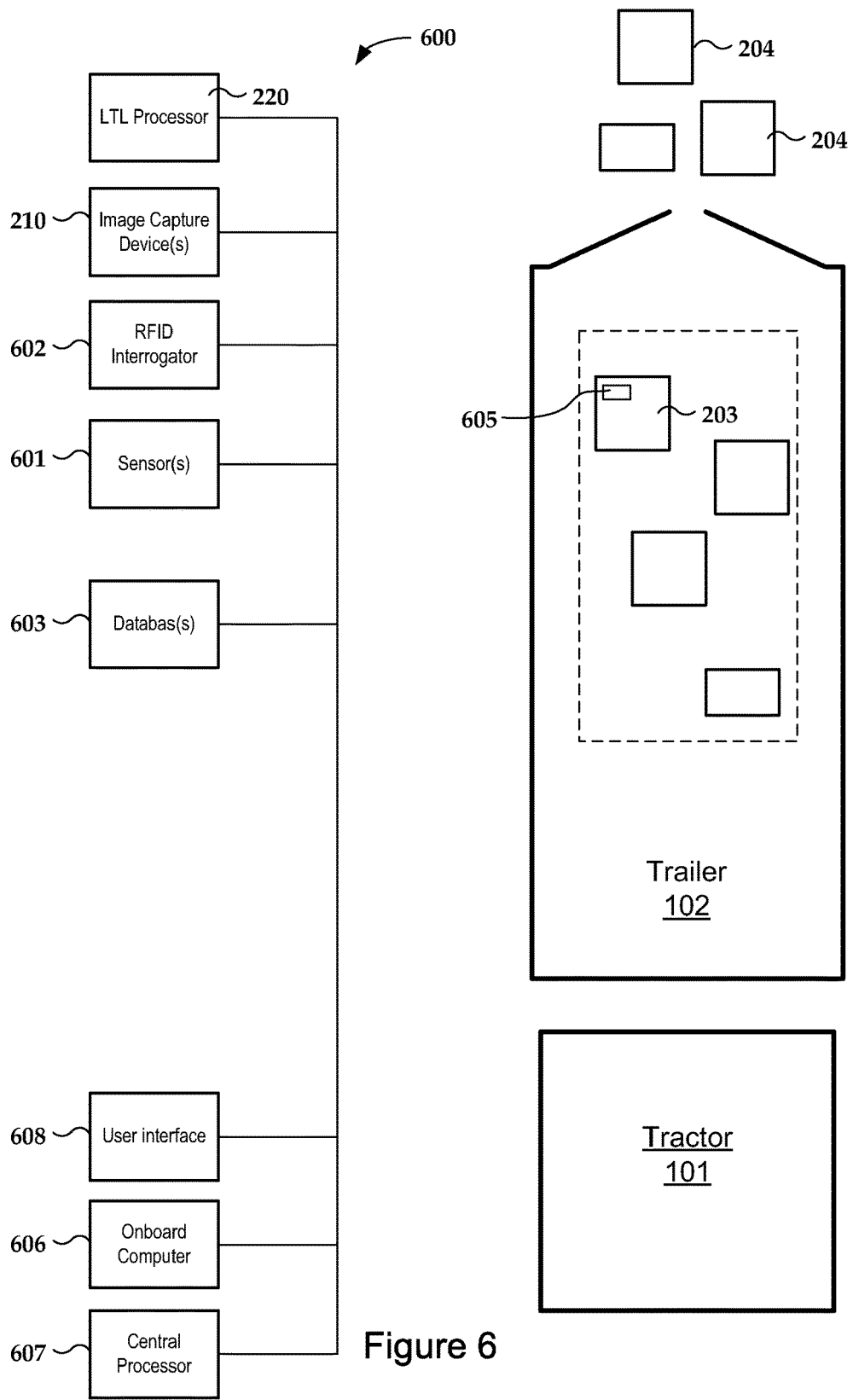

SYSTEMS AND METHODS FOR CARGO MANAGEMENT

RELATED PATENT DOCUMENTS

This application claims the benefit of Provisional Patent Application Ser. No. 62/038,706 filed on Aug. 18, 2014, to which priority is claimed pursuant to 35 U.S.C. § 119(e), and which is incorporated herein by reference.

TECHNICAL FIELD

This application relates generally to devices, systems, and methods pertaining to cargo shipping.

SUMMARY

Some embodiments involve a system for use with a vehicle comprising a tractor and a trailer includes one or more image capture devices. The one or more image capture devices capture images of the interior of a trailer and/or cargo items of the trailer. An image processor estimates available cargo space within the trailer based on the captured images.

Some embodiments are directed to a system that includes one or more image capture devices configured to capture images of cargo items of the trailer. An image processor determines dimensions of the cargo items using the captured images. A loading processor is configured to generate a loading plan for the cargo items based on the captured images. The loading processor can be configured to update the loading plan as the vehicle proceeds along a route.

According to some embodiments, the image capture device captures images of cargo items as the cargo items are unloaded from the trailer. The image processor determines characteristics of the cargo items as they are unloaded from the trailer using the captured images. A docking processor generates a cross-docking distribution plan for distributing the cargo items to a plurality of secondary trailers based on the characteristics.

In some embodiments, the image capture devices are configured to capture images of cargo items as the cargo items are loaded onto or unloaded from the trailer. An event detector detects anomalous loading/unloading events based on the captured images.

BRIEF DESCRIPTION OF THE DRAWINGS

FIG. 6 is a block diagram of a system that includes various optional components that may be used to provide information about the available cargo space in the trailer en route along a less than load route;

The figures are not necessarily to scale. Like numbers used in the figures refer to like components. However, it will be understood that the use of a number to refer to a component in a given figure is not intended to limit the component in another figure labeled with the same number.

DESCRIPTION

Figure 1A:
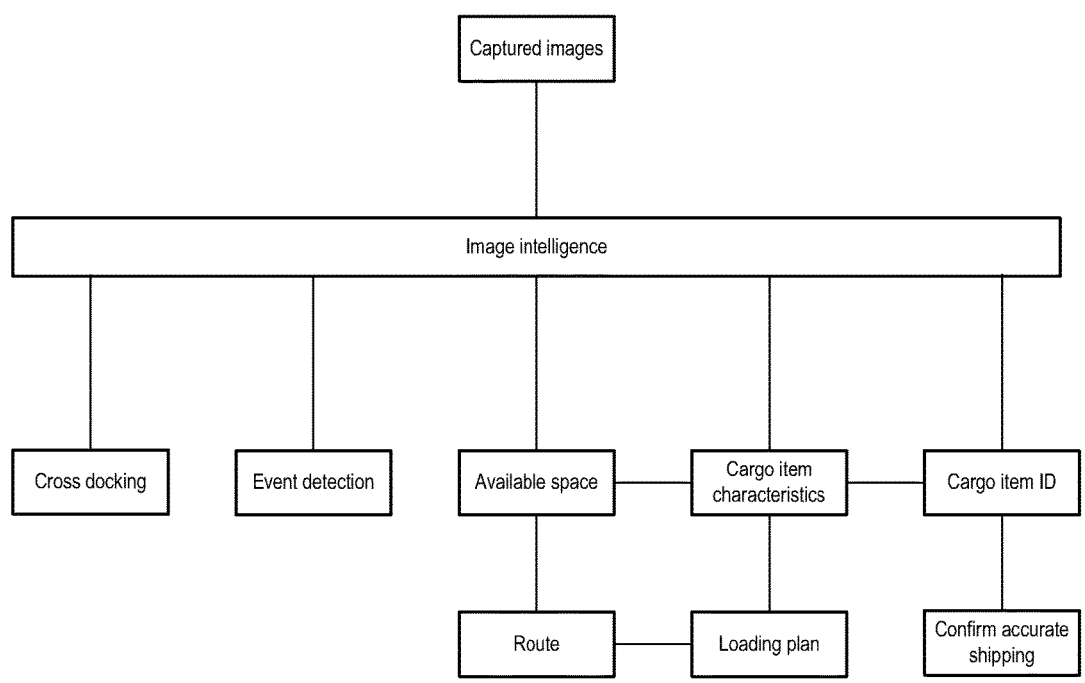
FIG. 1A is a conceptual diagram 1A is a conceptual diagram that illustrates various optional processes that may use image intelligence as discussed in various embodiments.

Some embodiments described herein involve the use of images to enhance various aspects of cargo transport. The images may comprise one or more of various types of images, including, but not limited to, still images, video, optical and/or laser scanned images, etc. The use of one or more of types of images to inform management of cargo and cargo vehicles is referred to herein as "image intelligence." FIG. 1A is a conceptual diagram that illustrates various optional processes that may use image intelligence as discussed herein.

In some embodiments, captured images and image intelligence are used to determine an amount of space available in a trailer. For example, captured images of the interior of a trailer can be analyzed to determine the amount of available space directly, by measuring the free space, or indirectly, buy measuring the amount of filled space and subtracting the filled space from total space. The trailer's route can be adjusted based on available space within the trailer.

In some embodiments, various characteristics of cargo items can be extracted from the images. According to some implementations, the characteristics of the cargo items can be extracted directly from the images, such as by measuring the dimensions of the cargo items and/or determining the shape of the cargo items using the captured images. In some implementations, characteristics of the cargo items can be extracted from images of information disposed on the cargo item, e.g., a label attached to the cargo item. In some scenarios, the information includes an identification code that can be obtained from the captured images. Image intelligence includes comparing an identification code obtained from an image of the cargo item to the cargo manifest to confirm accurate shipping.

In some implementations, the identification code can be used as an index to access a database that stores information about additional characteristics of the cargo items. In some scenarios, the information on the cargo item label may include cargo item characteristics, such as allowed orientation, destination, packing instructions, etc. The characteristics of the cargo items, whether obtained from the images or from a database, can be used to categorize the available space according to various types of available space. The trailer's route can be adjusted based on the types of available space within the trailer.

In some embodiments, image intelligence involves using captured images to inform development of a loading plan for a trailer. The loading plan may take into account various constraints and/or requirements, including the amount of available space, the type of available space, space efficiency and/or time efficiency specified. Space efficiency is associated with how the arrangement of cargo items in the trailer impacts the available space and time efficiency is associated with how the arrangement of cargo items in the trailer impacts the time needed to load and/or unload cargo items.

In some embodiments, image intelligence involves using captured images to facilitate distribution of cargo items for cross docking. In some embodiments, captured images are used for event detection during trailer loading and/or unloading.

Determining available space en route may be particularly useful for less than load (LTL) cargo shipping that involves transport of cargo loads that fill less than the total capacity of a trailer. A number of cargo loads are shipped together in a trailer, wherein each individual cargo load does not require the full capacity of the trailer. An LTL carrier may transport cargo items from many different customers in one trailer and can offer customers a more cost-effective method of shipping goods than the full truck load carrier.

Figure 1B:
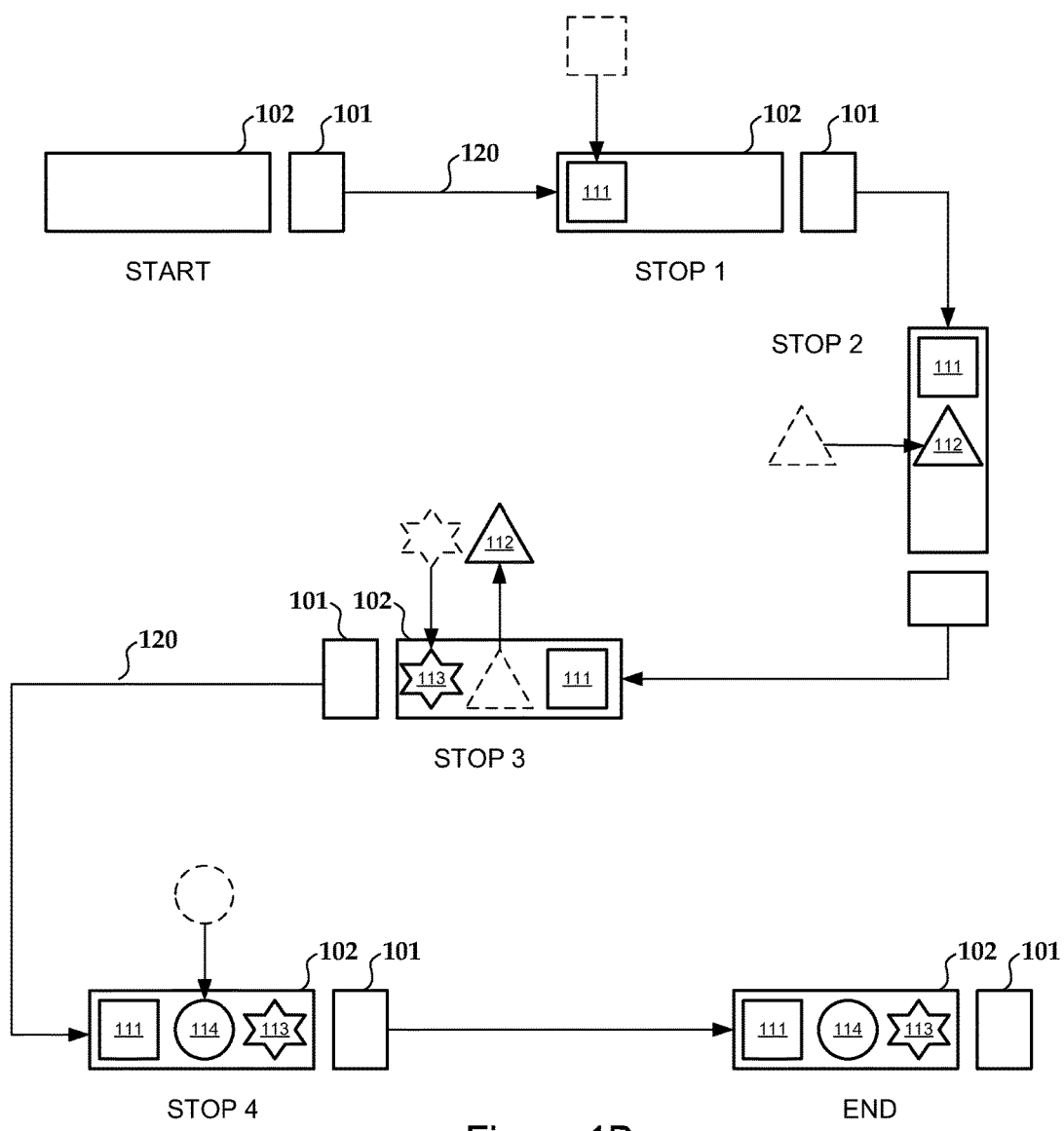
FIGS. 1B and 1C are diagrams illustrating less than load shipping for a vehicle along a planned route.

FIG. 1B is a diagram illustrating LTL shipping for a vehicle comprising a tractor 101 and a trailer 102 along a planned route 120. The route 120 proceeds from a start to an end destination and includes four stops where cargo loads 111-114 are loaded and/or unloaded. The route 120 may be planned in advance of the vehicle starting the route, the route planning taking into account the estimated size and/or shipping constraints of the cargo items to be loaded and/or unloaded. Each of the cargo loads 111-114 are LTL cargo loads, requiring less than the full space inside the trailer 102. At the start of the route 120, the trailer 102 is empty. At stop 1, a first LTL cargo load 111 is loaded onto the trailer 102; at stop 2, a second LTL cargo load 112 is loaded onto the trailer; at stop 3 LTL cargo load 112 is unloaded from the trailer and LTL cargo load 113 is loaded onto the trailer; at stop 4, LTL cargo load 114 is loaded onto the trailer 102. After stop 4, the trailer 102 is full and proceeds to its end destination where cargo loads 111, 113, 114 are unloaded.

Figure 1C:
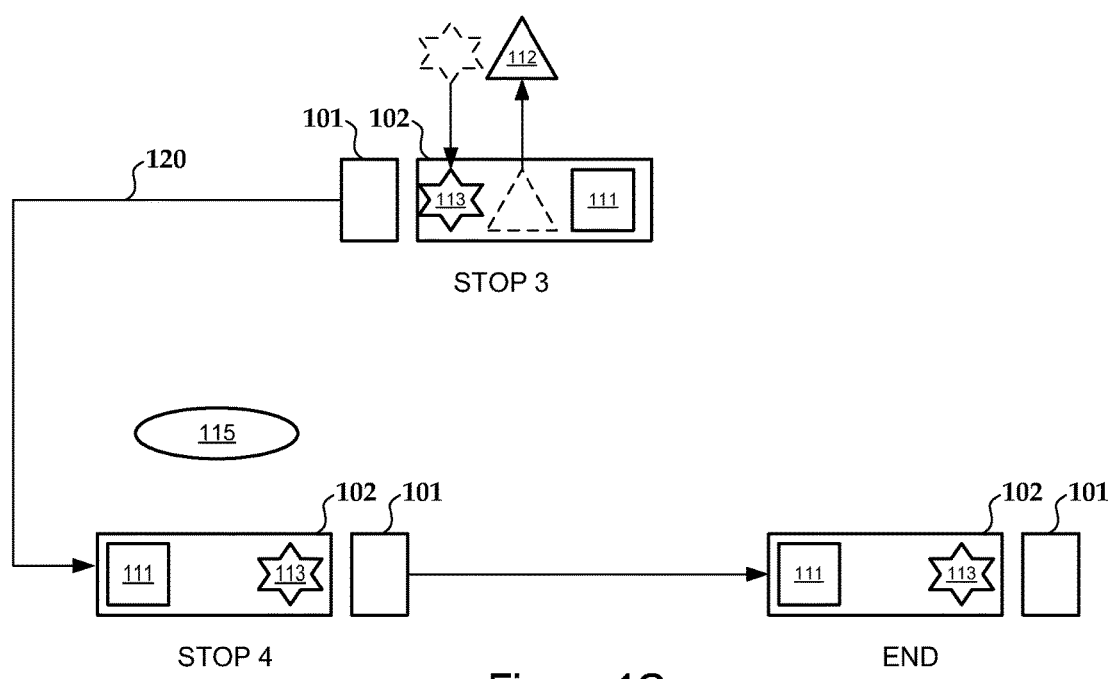

Consider the scenario illustrated in FIG. 1C, wherein the vehicle arrives at stop 4 to pick up cargo load 115 and find that cargo load 115 is too large to fit within the available space inside the trailer (or is otherwise unsuitable to be picked up e.g., due to allowed orientation, fragility, cargo set requirements, and/or other shipping constraints). For example, in some scenarios, the available space may be less than what was initially planned for due to inaccuracy and/or error in the measurement of cargo load 115, inaccuracies and/or errors in the measurements of previously loaded items 111, 113, packing the trailer with sub-optimal space efficiency, oddly shaped items, and/or items that have shipping constraints that were not taken into account in the advance planning process. The vehicle leaves stop 4 without loading cargo load 115 and proceeds to the end destination. Pick up for cargo load 115 must be rescheduled. These errors in route planning for LTL shipments cause shipping delays and increased shipping costs.

Some embodiments discussed herein relate to approaches for providing information about the available cargo space in the trailer en route along an LTL route. For example, using en route available space determination for LTL cargo shipping allows the route to be adjusted along the route if the available space in the trailer is less than the space required for the cargo load at an originally scheduled (but not yet made) stop. With reference to FIG. 1C, if it can be determined at stop 3 that the available space in the trailer is insufficient to accommodate cargo load 115 at stop 4, the vehicle may be rerouted to another stop where a cargo load is waiting that does fit within the available space of the trailer 102. A different vehicle with sufficient available trailer space may be routed to pick up cargo load 115. In some embodiments, the amount of available space may be further identified based on the type of space, e.g., floor space, space suitable for fragile items, etc., as discussed further herein.

Figure 2:
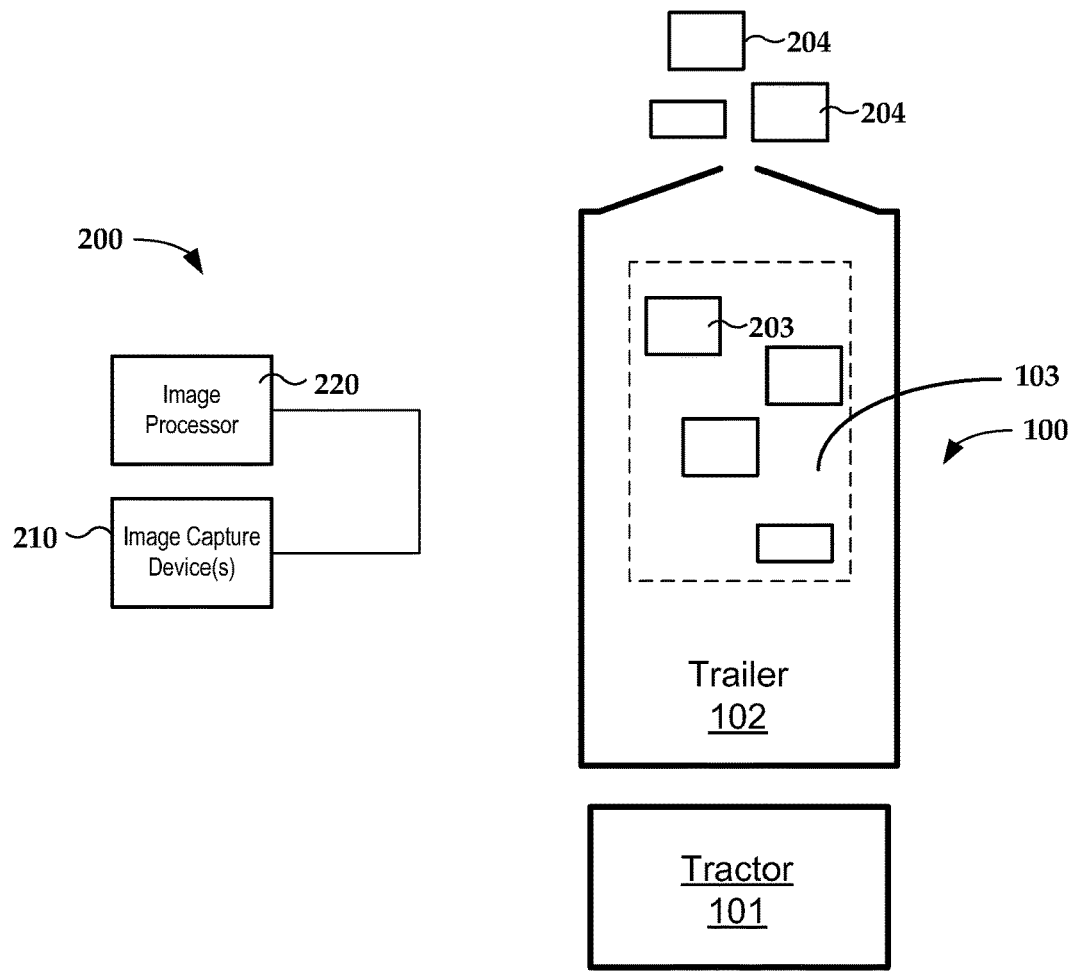
FIGS. 2 and 3 illustrate a system and method for en route determination of available cargo space within a trailer.
Figure 3:
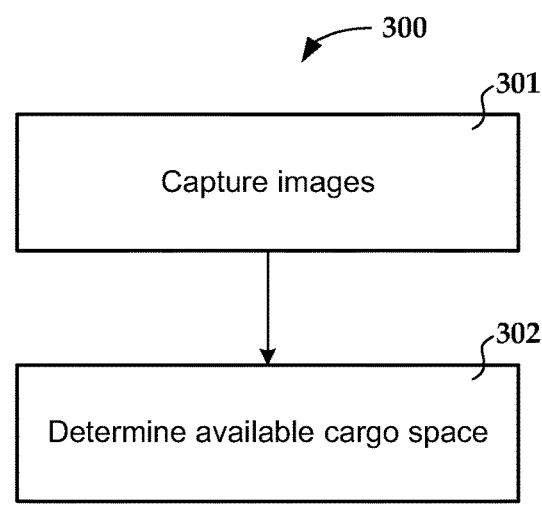

FIGS. 2 and 3 illustrate a system 200 and method for en route determination of available cargo space within a trailer. The system 200 can be used in conjunction with a vehicle 100 comprising a tractor 101 and trailer 102, or other modes of shipping, e.g., cargo planes, trains, or ships. Some cargo items 203 of various sizes and shapes are shown already loaded within the interior 103 of the trailer 102 and some cargo items 204 are shown outside the trailer 102, e.g., on the loading dock, waiting to be loaded into the trailer 102.

The system 200 includes one or more image capture devices configured to capture images and an LTL processor 220 that includes circuitry for analyzing the images. Each image capture device may be configured to capture 301 images of one or both of an interior of a trailer and cargo items of the trailer. The LTL processor 220 is configured to analyze the images and to determine 302 available cargo space within the trailer based on analysis of the images. In some embodiments, at least some of the processes 301-302 of flow diagram of FIG. 3 can be performed manually; in some embodiments, all of the processes 301-302 can be performed automatically; and in some embodiments, the processes 301-302 may be performed by a combination of manual and automatic techniques.

The captured images may be 2D or 3D images and/or may be still or video images, for example. In various embodiments, the image capture devices 210 may comprise one or more of a video camera, a still camera, an optical scanner, an infrared scanner, a laser scanner, and/or any other type of suitable image capture device.

The one more image capture devices 210 can be positioned in any suitable location to capture images of the interior 103 of the trailer 102 and/or the cargo items 203, 204 before and/or after they are loaded in the trailer 102. For example, one more image capture devices 210 may be positioned inside trailer 102, one or more image capture devices 210 may be positioned outside trailer 102, (e.g., on the loading dock), and/or image capture devices 210 may be positioned both inside and outside the trailer 102 in implementations where multiple image capture devices 210 are used. For example, in some embodiments, the one or more image capture devices may be attached at one or more of the upper corners in the interior 103 of the trailer 102, along the top interior of the trailer 102, and/or elsewhere within the trailer. Some or all of the image capture devices 210 may have a field of view that includes the interior 103 of the trailer 102 and/or cargo items 203 already loaded in the trailer 102. Some or all of the image capture devices 210 may have a field of view that captures images of cargo items 204 not yet loaded inside the trailer 102 and/or to capture images as the cargo items 204 are loaded into the trailer 102. In some embodiments, the field of view, focus, and/or other characteristics of the image capture device can be adjusted, e.g., by an operator via a user interface and/or automatically by the LTL processor 220.

In some embodiments, the LTL processor 220 can be configured to determine dimensions of the available cargo space based on images of the vacant (unfilled) space within the interior of the trailer. In some embodiments, the LTL processor can be configured to determine dimensions of the available cargo space based on images of the occupied space within the interior of the trailer. In some embodiments, the LTL processor can be configured to estimate dimensions of the available cargo space by determining dimensions of the cargo items loaded into the trailer from the captured images and a generating a loading plan for the trailer based on the dimensions of the cargo items. The loading plan provides a model that indicates a position for each cargo item. The available space can be estimated from the model.

Figure 4:
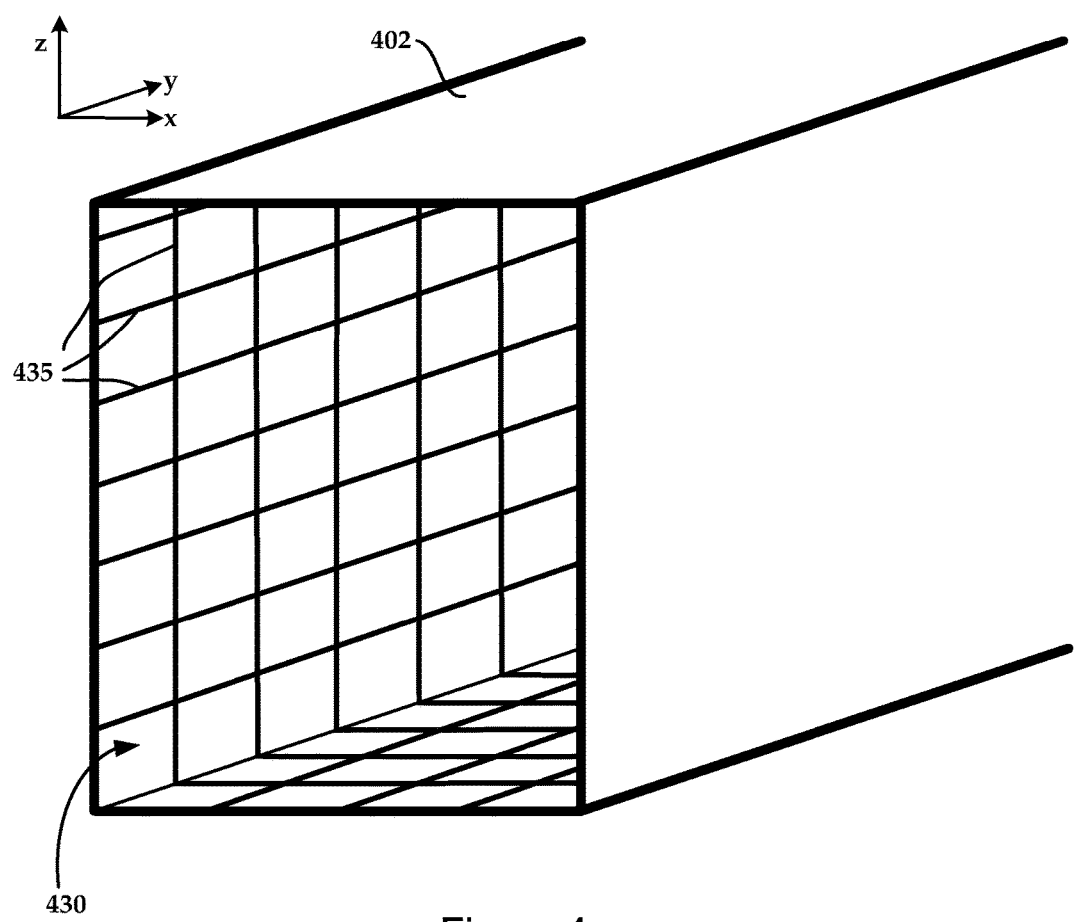
FIG. 4 shows an interior of a trailer with graduation marks disposed along the top bottom and/or sides of the trailer.

In some scenarios, graduation marks or other types of visual scales may be disposed inside or outside the trailer to facilitate determining one or more of the dimensions of the cargo items, dimensions of the vacant space, and dimensions of the filled space. FIG. 4 shows an interior 430 of a trailer 402 with graduation marks 435 disposed along the top bottom and/or sides of the trailer 402. The graduation marks 435 can be used to determine dimensions along the x, y, and z axes. Graduation marks and/or other types of scales can alternatively or additionally be disposed outside the trailer, e.g., on the loading dock or elsewhere. In some implementations, the LTL processor may compare the vacant space in the trailer in the x, y, and/or z dimensions to the graduation marks to determine available cargo space. Alternatively, the LTL processor may compare the space occupied by cargo items in the trailer in the x, y, and z dimensions to the graduation marks to determine the occupied space and may subtract the occupied space from the total space to determine the available cargo space.

Figure 5A:
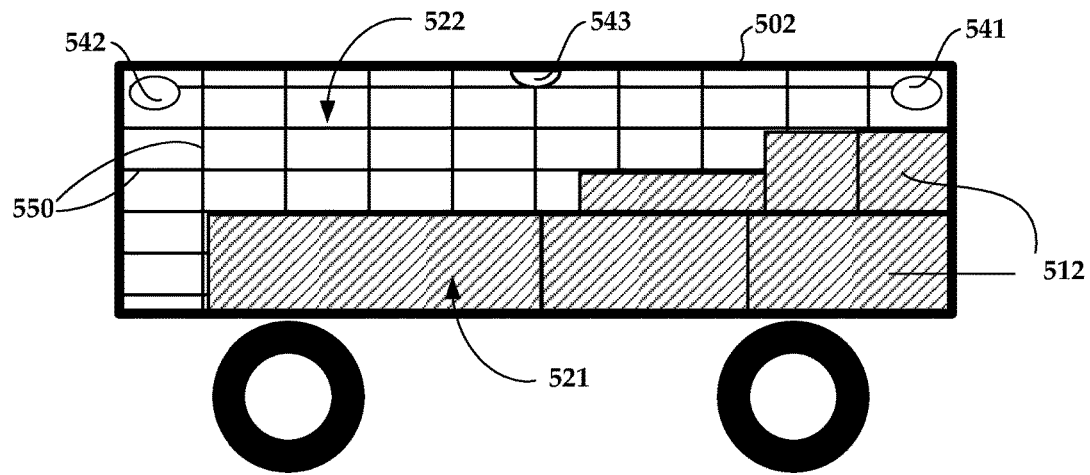
FIGS. 5A and 5B show side views of the interior of a trailer with cargo items in occupied space of the trailer and unoccupied, available space.
Figure 5B:
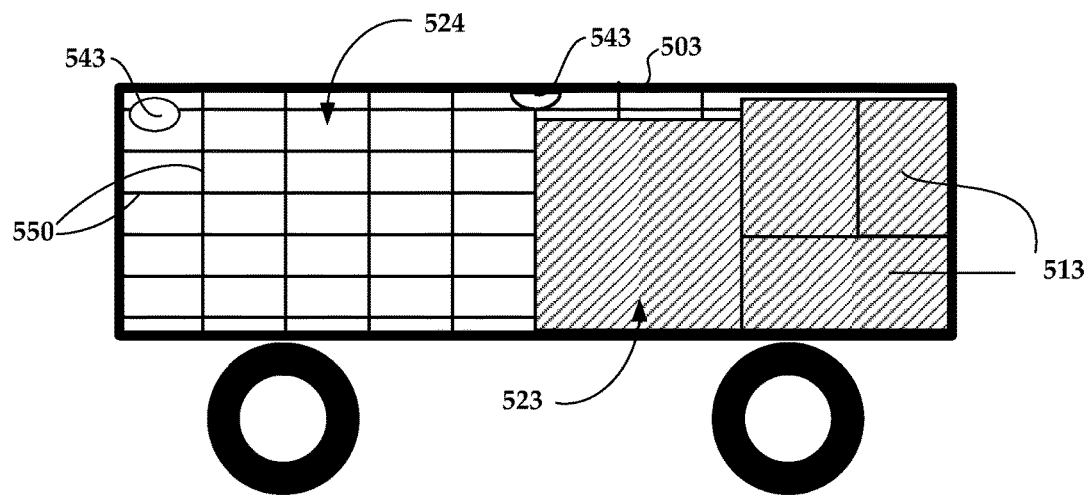

In some embodiments, the LTL processor may determine the types of available cargo space in addition to the total amount of available cargo space. FIG. 5A illustrates a side view of the interior of trailer 502 with cargo items 512 in occupied space 521 of the trailer 502 and unoccupied, available space 522. FIG. 5B illustrates a side view of the interior of a trailer 503 with cargo items 513 in occupied space 523 and available space 524. Trailers 502 and 503 include cameras 541, 542, 543 located in the upper corners and middle top within the trailers 502, 503. The depictions of trailers 502 and 503 show graduation marks 550 disposed along the interior sides of the trailers 502, 503. Although not shown in FIGS. 5A and 5B, additional graduation marks may be disposed along the interior bottom and top of the trailer 502, 503. The total amount of available space in trailer 502 is equal to the total amount of available space in trailer 503 in this example. However, the type of available space in trailers 502 and 503 differs at least because of the loading configuration of the cargo items in trailers 502, 503. For example, it will be appreciated that the cargo space available 522 in trailer 503 includes more floor space than the cargo space available 524 in trailer 502. Thus, the type of space in trailer 502 facilitates more cargo items that require floor placement. In some embodiments, the LTL processor may be configured to determine the type of available space, e.g., floor space, space on top of other cargo, etc. from the images captured by the cameras.

FIG. 6 illustrates a system 600 that includes various optional components that may be used to provide information about the available cargo space in the trailer en route along an LTL route. For example, FIG. 6 shows one or more sensors 601 configured to detect various characteristics of the cargo items 203, 204. In some embodiments, the sensors 601 may include a weight scale for measuring the weight of cargo items 203, 204.

In some embodiments, the system 600 includes an interrogator 602, e.g., a wireless radio frequency identification (RFID) interrogator, configured to interrogate RFID tags 605 attached to the cargo items 203, 204. The RFID tags 605 may provide identification information along with stored information about characteristics of the cargo item, e.g., weight, dimensions, fragility, allowed orientations, allowed positions, e.g., bottom only, top only, stacking limits, value, destination, delivery priorities, cargo item set information and/or other characteristics of the cargo items 203, 204.

In some embodiments, the RFID tags 605 may include only a limited amount of information about the cargo items 203, 204, e.g., only the identification code. The LTL processor 220 may be configured to access a database 603 either directly, or by sending a data access request referencing the identification code through another processor, such as an onboard computer 606 of the tractor 101 and/or a central processor 607 of a transportation management system. The identification code of each cargo item 203, 204 can be used as an index to access additional information stored in database 603 about the characteristics of the cargo item 203, 204. In some implementations, the LTL processor 220 and/or the database 603 may be part of the onboard computer system of the truck 101. In some embodiments, the LTL processor 220 and/or the database 603 may be part of a computer system located at a loading dock facility.

In some configurations, the LTL processor 220 uses the additional information about the cargo items to determine the amounts of various types of space available in the trailer. For example, the LTL processor may report X cubic feet of total space available, with Y cubic feet of floor space available, and Z cubic feet of top space available. The LTL processor 220 may also report additional information about the cargo items in the trailer, A1 is the number of fragile cargo items occupying A2 cubic feet, B1 is the number of "bottom only" cargo items occupying B2 cubic feet of floor space, etc. Results of the cargo space analysis and/or other analyses performed by the LTL processor and/or other processors may be displayed to an operator on a user interface 608 and/or may be used to modify the route. For example, in some embodiments, route creation and/or modification may be performed by the onboard computer 606 and/or a central processor 607.

Additional information about systems and methods for using images capture devices disposed on and/or within a trailer is provided in U.S. Provisional Patent Application No. 62/038,720 filed on Aug. 18, 2014, and incorporated herein by reference.

According to some embodiments, a mobile gateway unit can be implemented at the onboard system. A mobile gateway provides a wireless access point (e.g., Wi-Fi hotspot) and a server that provides sensor, image capture, and other data via a network server. This server runs locally on the vehicle, and may utilize a known data access protocol, such as Hypertext Transport Protocol (HTTP). In this way, a commodity user device such as smartphone or tablet can be used to access the vehicle data and other fleet management-type data. This can reduce costs and leverage the development and improvements in general-purpose consumer and/or commercial mobile devices. For example, features such as voice recognition, biometric authentication, multiple applications and protocol compatibility, are available "out-of-the-box" with modern mobile devices, and these features can be useful for in-cab applications.

The mobile gateway serves generally as a data collection and disbursement device, and may include special- or general-purpose computing hardware, such as a processor, a memory, and input/output (I/O) circuitry. In some embodiments, the event recorder of the onboard system can be wirelessly coupled to the mobile gateway, such as via WiFi® or Bluetooth®. The mobile gateway can also include a sensor interface that may be coupled to external data gathering components such as sensor controller, one or more image capture devices, add-on sensors, microphones, among others. The sensor interface may include data transfer interfaces such as serial port (e.g., RS-232, RS-422, etc.), Ethernet, Universal Serial Bus (USB), FireWire, etc.

The sensor controller coupled to the mobile gateway may be configured to read data from vehicle type busses, such as Controller Area Network (CAN). Generally, CAN is a message-based protocol that couples nodes to a common data bus. The nodes utilize bit-wise arbitration to determine which node has priority to transmit onto the bus. Various embodiments need not be limited to CAN busses; the sensor controller (or other sensor controllers) can be used to read data from other types sensor coupling standards, such as power-line communication, IP networking (e.g., Universal Plug and Play), I²C bus, Serial Peripheral Interface (SPI) bus, vehicle computer interface, etc. The sensor controller may be external to the mobile gateway, or it may be incorporated within the mobile gateway, e.g., integrated with main board and/or as an expansion board/module.

In addition to providing data sources, the mobile gateway can employ a publish/subscribe model, which also allows for flexible and extendable views of the data to vehicle occupants (e.g., such as via a user device). The mobile gateway can include a readily-available proximity radio that may use standards such as Wi-Fi® or Bluetooth®. The proximity radio may provide general-purpose Internet access to the user device, e.g., by routing data packets via the wireless network used to communicate with a cloud gateway. A server component can provide local content (e.g., content produced within the mobile gateway) to the user device over the proximity radio via well-known protocols, such as HTTP, HTTPS, Real-Time Streaming Protocol (RTSP), File Transfer Protocol (FTP), Simple Mail Transfer Protocol (SMTP), etc. A commercially available application such as a browser or media player running on the user device can utilize the services of the server component without any customization of the user device. Embodiments of the present disclosure can be implemented to include a mobile gateway facility and functionality as disclosed in commonly owned, U.S. Provisional Patent Application No. 62/038,611 filed Aug. 18, 2014, commonly owned, U.S. Provisional Patent Application No. 62/038,592 filed Aug. 18, 2014, and commonly owned, U.S. Provisional Patent Application No. 62/038,615 filed Aug. 18, 2014, each of which is incorporated herein by reference.

Figure 7:
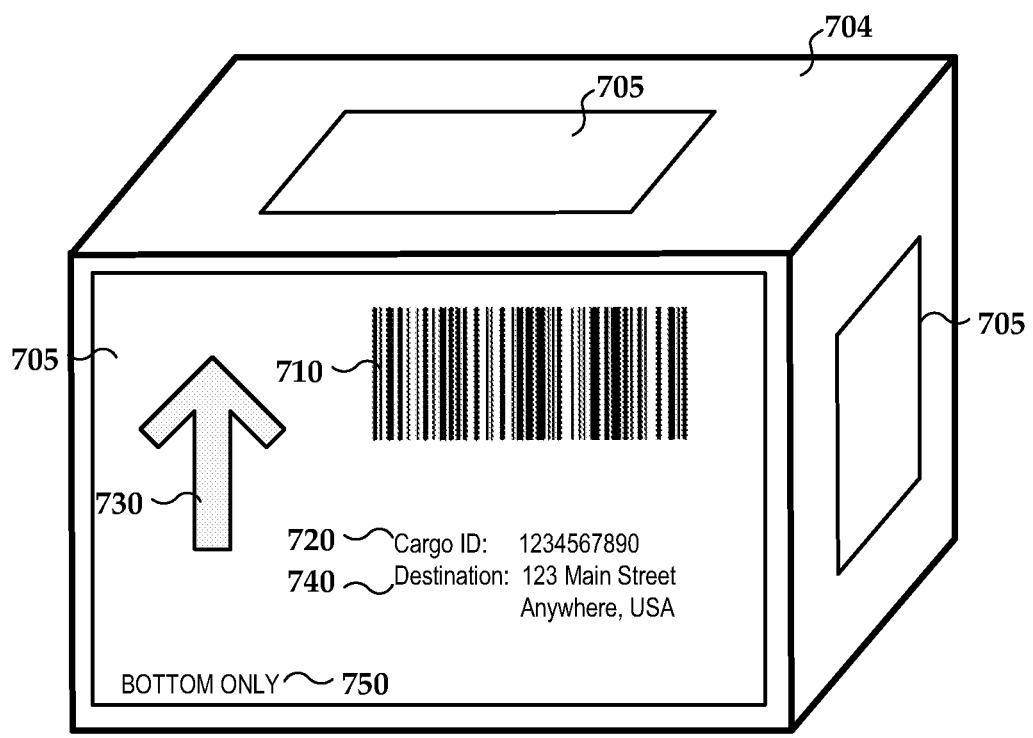
FIG. 7 shows a cargo item that has information printed on the cargo item label.

In some implementations, the LTL processor may extract at least some of the additional information about the cargo items from the images of the cargo items obtained by the image capture device. For example, additional information about the cargo items may be printed directly on the cargo items or on their packaging or labels, as illustrated in FIG. 7. FIG. 7 shows a cargo item 703 that has additional information printed on the cargo item label 705. The label 705 may be placed in a number of locations, e.g., all six sides of a rectangular box, to ensure the label appears in the image(s) of the cargo item captured by the image capture device. In some implementations, the additional information may include a bar code 710 and/or an alphanumeric code 720 that identifies the cargo item 703. The bar code 710 and/or alphanumeric code 720 can include information about the characteristics of the cargo item and/or can be used to access a database having the characteristics stored therein. As shown in FIG. 7, the label 705 can include allowed orientation symbol(s) 730, destination information 740, allowed positions 750, and/or other characteristics of the cargo item 703.

Figure 8:
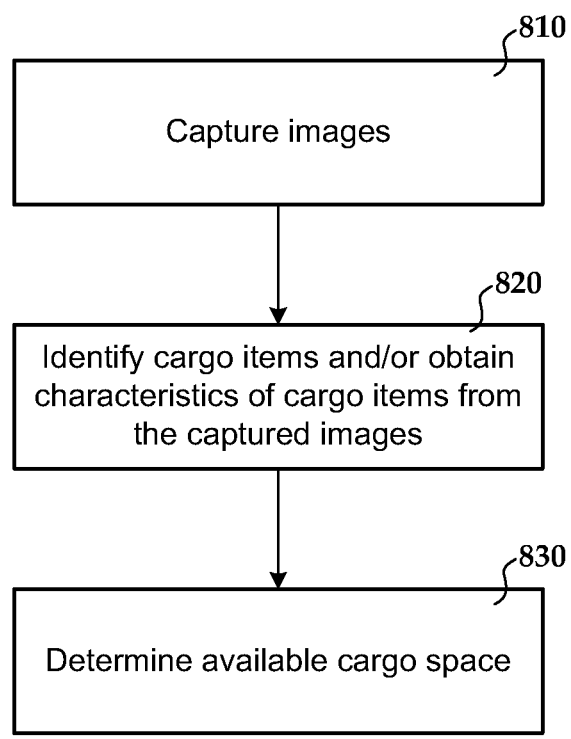
FIG. 8 is a flow diagram of a method of providing less than load cargo shipping in accordance with various embodiments.

FIG. 8 is a flow diagram of a method of providing LTL shipping in accordance with various embodiments. An image capture device is used to capture images 810 of the cargo items before, after, and/or during loading of the cargo items on the trailer. Optionally, identification information is extracted 820 from the captured images, e.g., bar codes, identification codes, etc., that identify the cargo item. Additional information, e.g., customer requirements, cargo item characteristics, and/or destination information, about the cargo item may be obtained by accessing a database. Optionally, characteristics of the cargo item are extracted 820 from the captured images. Optionally, the LTL processor may use the identification code and/or destination information extracted from the images to confirm that the cargo item is correctly scheduled for pick up before leaving the pickup location, thereby reducing shipping errors. According to some aspects, the LTL processor determines 830 the total available cargo space and/or the available cargo space of various types based on the identification of the cargo item, and/or characteristics of the cargo item extracted from the captured images.

In some embodiments, at least some of the processes 810-830 of flow diagram of FIG. 8 can be performed manually; in some embodiments, all of the processes 810-830 can be performed automatically; and in some embodiments, the processes 810-830 may be performed by a combination of manual and automatic techniques.

Figure 9:
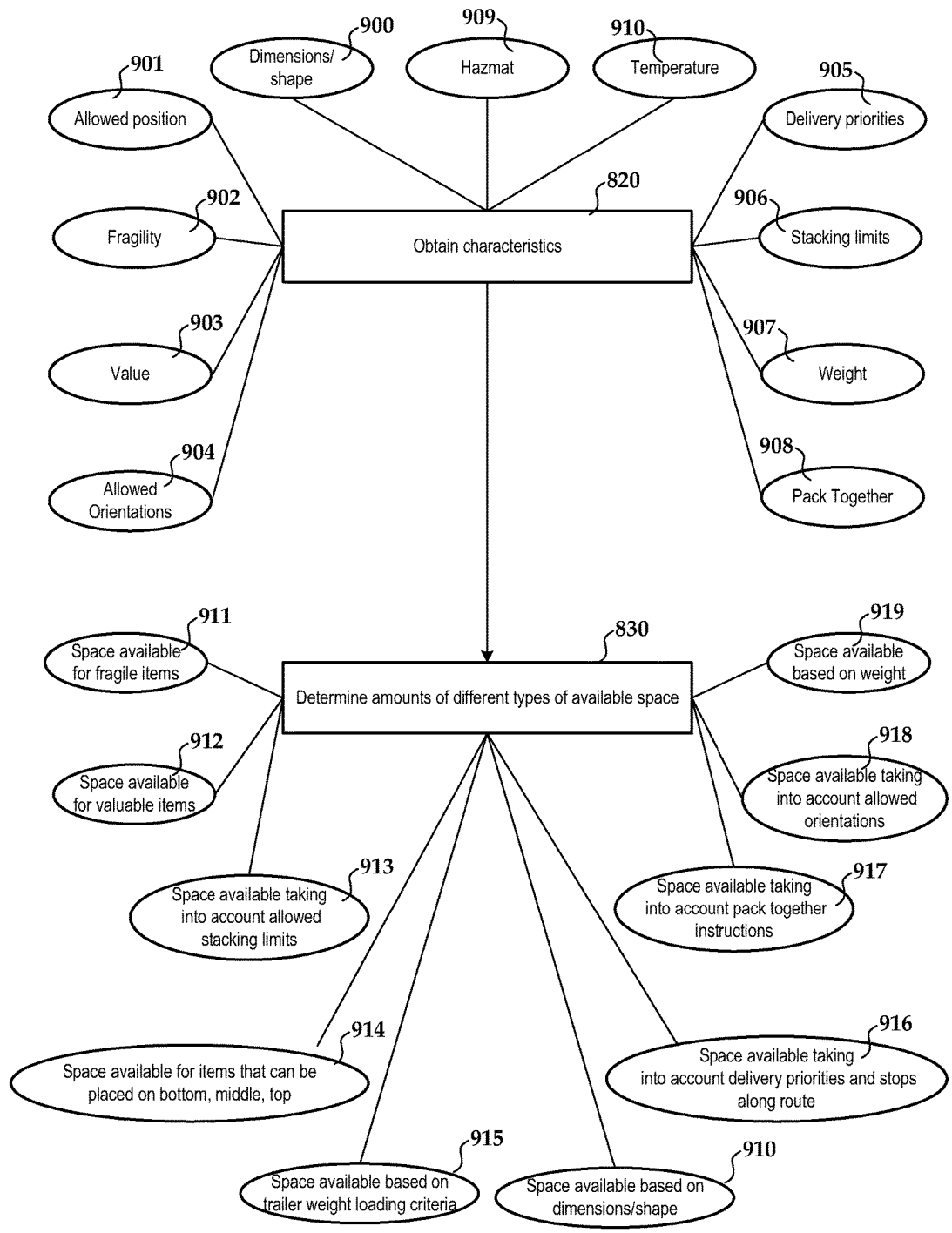
FIG. 9 illustrates processes of the flow diagram of FIG. 8 in more detail.

FIG. 9 illustrates processes 820 and 830 of the flow diagram of FIG. 8 in more detail. Obtaining characteristics 820 of the cargo items may involve obtaining information about one or more of cargo item dimensions and shape 900, hazardous material status 909, allowed position 901, e.g., top only, bottom only, etc., fragility 902, value 903, allowed orientation(s) 904, delivery priority 905, stacking limits 906, weight 907, sets of cargo items with pack together instructions 908, and/or other information about other cargo item characteristics. The process of determining amounts of different types of available space can involve one or more of determining 910 space available for cargo items having certain dimensions and/or shape, determining 911 space available for fragile items, determining 912 space available for valuable items, determining 913 space available taking into account allowed stacking limits, determining 914 space available for items that have allowed locations, e.g., top, bottom, middle, determining 915 space available based on trailer weight loading criteria, determining 916 space available taking into account deliver priorities and unloading/loading at stops along the route, determining 917 space available taking into account cargo items with pack together delivery instructions, determining 918 space available taking into account allowed orientations of cargo items, and determining 919 space available taking into account cargo item weight.

Figure 10:
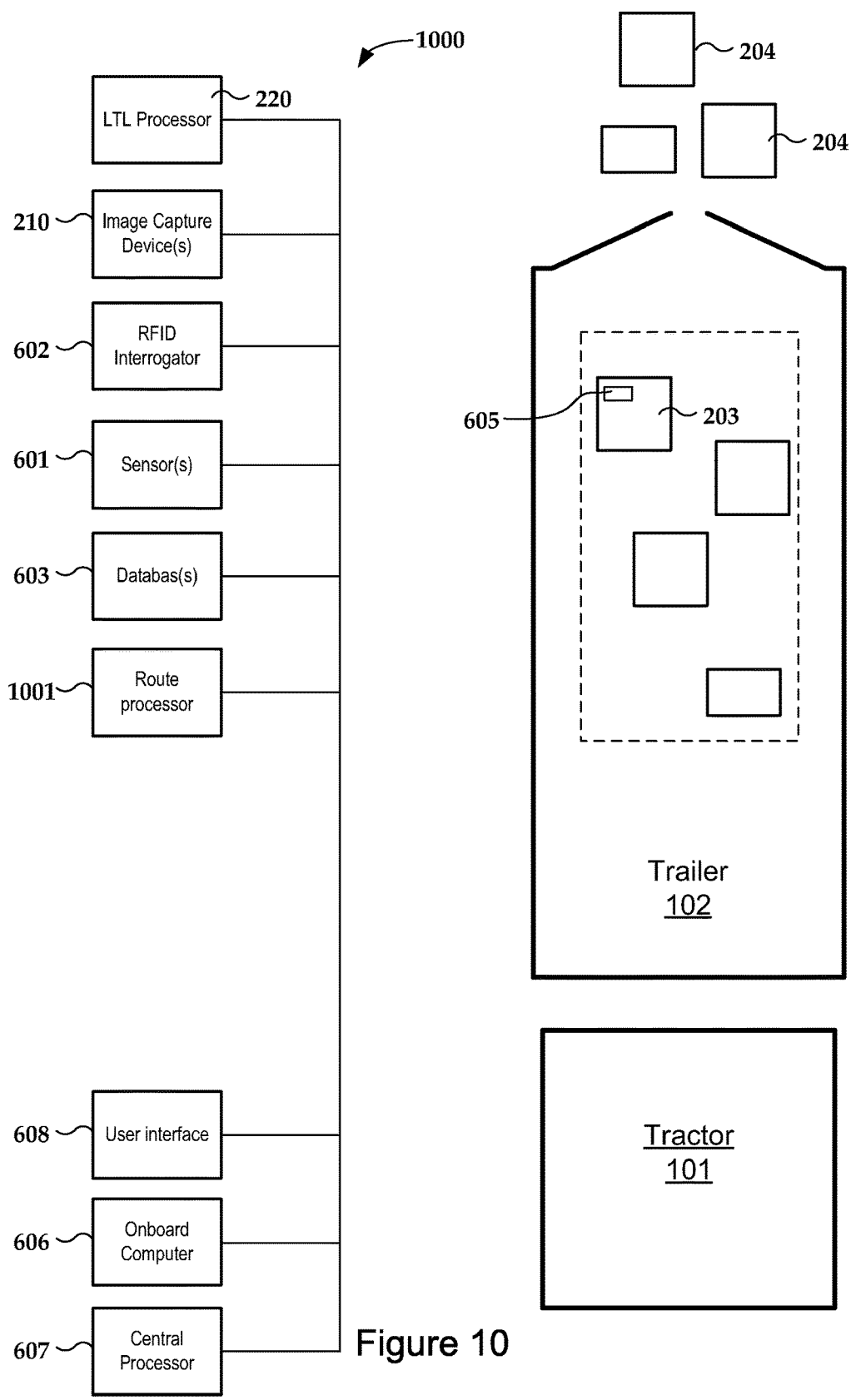
FIG. 10 illustrates a system that includes an optional route processor coupled to receive available space information.
Figure 11:
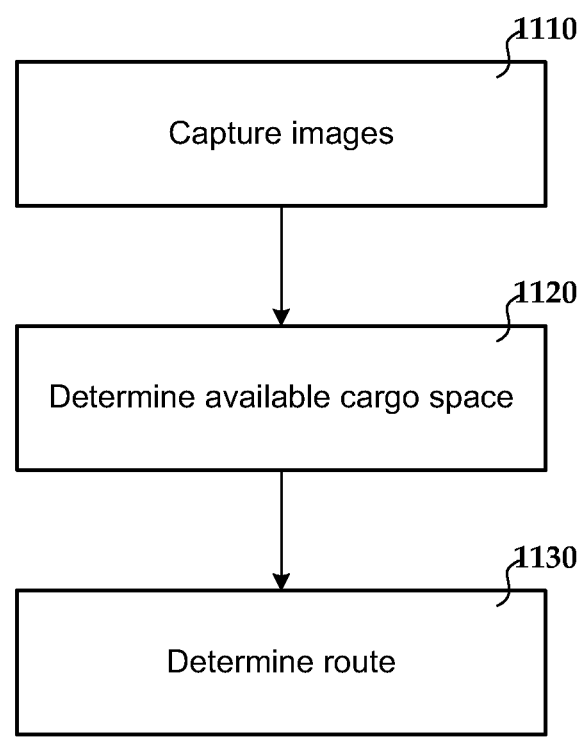
FIG. 11 is a flow diagram illustrating a process of determining a route for less than load shipping based on available space information determined en route.

Information about the space available in the trailer and/or the type of space available may be used to determine a route of the trailer. FIG. 10 illustrates a system 1000 that is similar in many respects to system 600 of FIG. 6 and includes an optional route processor 1001 coupled to receive available space information from the LTL processor 220. The route processor 1001 uses the available space information to determine the route of the trailer. As illustrated in FIG. 11, a process for determining the route of the trailer involves capturing 1110 images of cargo items and/or the interior of the trailer. The available cargo space is determined 1120 from the captured images, and the route may be modified 1130 based on the available space. In some implementations, a user may modify the route based on the available cargo space. In some implementations, the route modification can be performed by a route processor which is part of the on board system or located in a remote central office.

In some embodiments, at least some of the processes 1110-1130 of flow diagram of FIG. 8 can be performed manually; in some embodiments, all of the processes 1110-1130 can be performed automatically; and in some embodiments, the processes 1110-1130 may be performed by a combination of manual and automatic techniques.

For example, in some embodiments, the routing processor 1001 can be configured to determine one or more next stops where cargo items may be picked up and/or dropped off based on the available cargo space. In some implementations, the routing processor 1001 may modify a previous route for the vehicle based on the available cargo space. For example, the routing processor 1001 may compare the available space to a required space of cargo items scheduled for pick up at the next stop. The routing processor may determine whether the required space exceeds the available space and, if so, may modify the route.

The space available in the trailer and/or the type of space available can be affected by the way the trailer is loaded. For example, a trailer loaded such that many or all cargo items are placed on the trailer floor will have less available floor space when compared to a loading that involves stacking the items. More space-efficient packing can provide more space available than less-efficient packing. The loading of the trailer can affect the trailer route because a less efficiently packed trailer may not have space available to pick up additional cargo items, whereas a more efficiently packed trailer has space available for the additional cargo items.

Time-efficient packing for LTL routes may take into account the order that the cargo items are picked up and/or dropped off and sets of items with pack together instructions. For example, an optimal loading map that designates locations in the trailer for each cargo item of an LTL route may achieve both space and time efficiencies.

Figure 12:
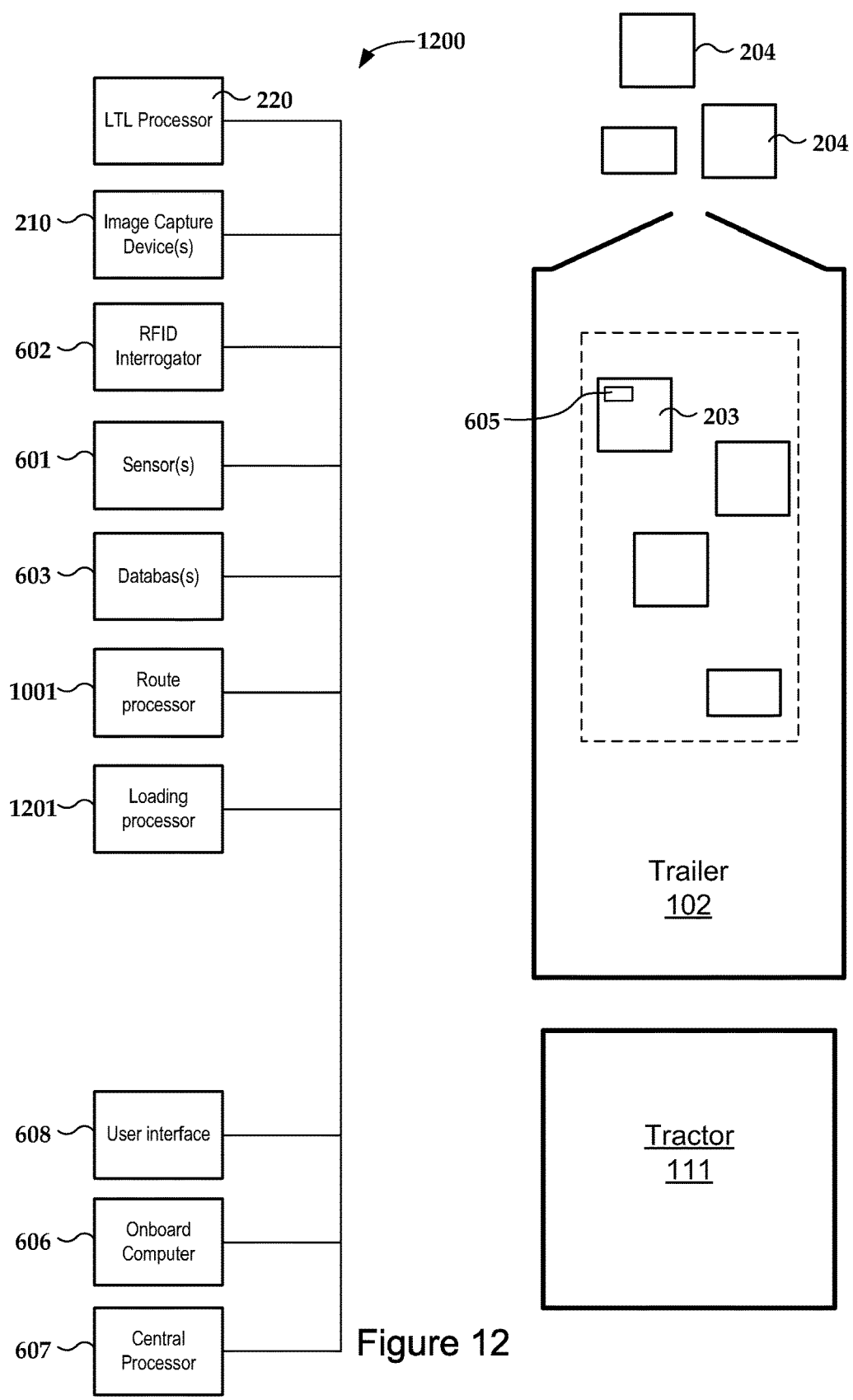
FIG. 12 is a block diagram of a system that includes an optional loading processor.

FIG. 12 is a block diagram of a system that is similar in many respects to the system 1000 of FIG. 10 and includes an optional loading processor 1201. The loading processor 1201 can receive information from other components of the system 1200, such as the LTL processor 220 and/or the route processor 1001 and/or the database, and use the information to generate a loading map for the trailer 102. The loading map includes positions for each cargo item based characteristics of the cargo items and/or route information. Note that it is possible for a cargo item to have different positions along different portions of the route to achieve space and time efficient loading. The characteristics taken into account by the loading processor 1201 in generating the loading map can include the characteristics discussed in connection with FIG. 9 and/or other characteristics. The route information used by the loading processor can include the order in which cargo items are picked up and/or dropped off along the route, the distance along each segment of the route between stops, and/or other route information.

Figure 13A:
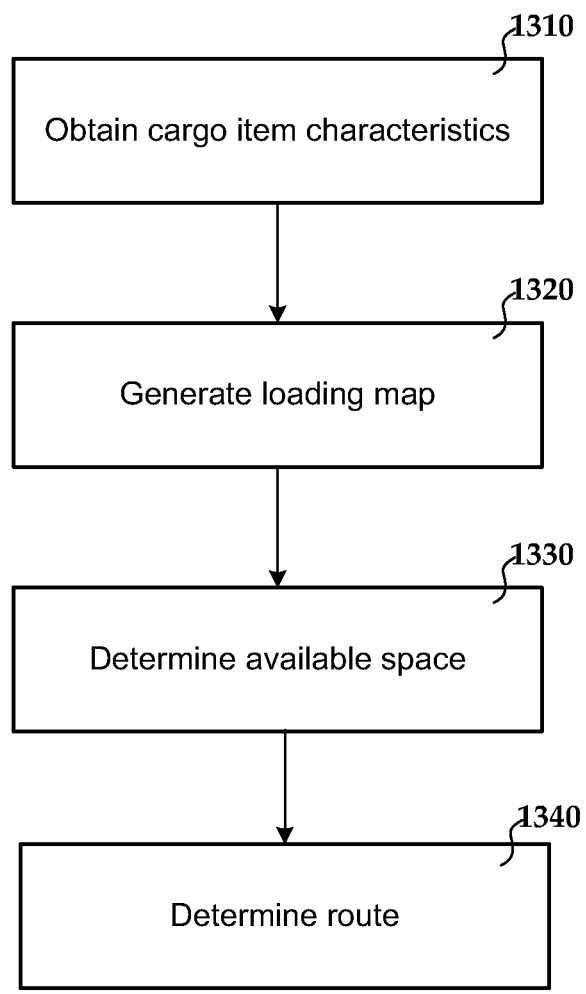
FIG. 13A is a flow diagram illustrating a process for determining available space including generating a loading map in accordance with some embodiments.

FIG. 13A is a flow diagram illustrating a process for determining available space including generating a loading map in accordance with some embodiments. Optionally in some embodiments, at least some cargo item characteristics can be obtained 1310 by extracting information, e.g., dimensions, shape, etc., about the cargo items from captured images. In some embodiments, at least some cargo item characteristics, e.g., dimensions and/or weight, etc., are obtained by accessing a database or may be obtained manually, e.g., input directly from the user interface or scanned into the onboard computer. A loading map is generated 1320, e.g., for each stop, based on the cargo item characteristics. The loading map can be used by the operator to load cargo items, placing the items in the positions designated by the loading map. In some embodiments, the available space in the trailer can be determined 1330 by estimating the available space based on the loading map. The available space can be determined 1330 by measuring the available space using captured images. In some embodiments the estimation based on the loading map is confirmed by the measurements. The trailer route can be determined 1340 based on the available space.

In some embodiments, at least some of the processes 1310-1340 of flow diagram of FIG. 13A can be performed manually; in some embodiments, all of the processes 1310-1340 can be performed automatically; and in some embodiments, the processes 1310-1340 may be performed by a combination of manual and automatic techniques.

Figure 13B:
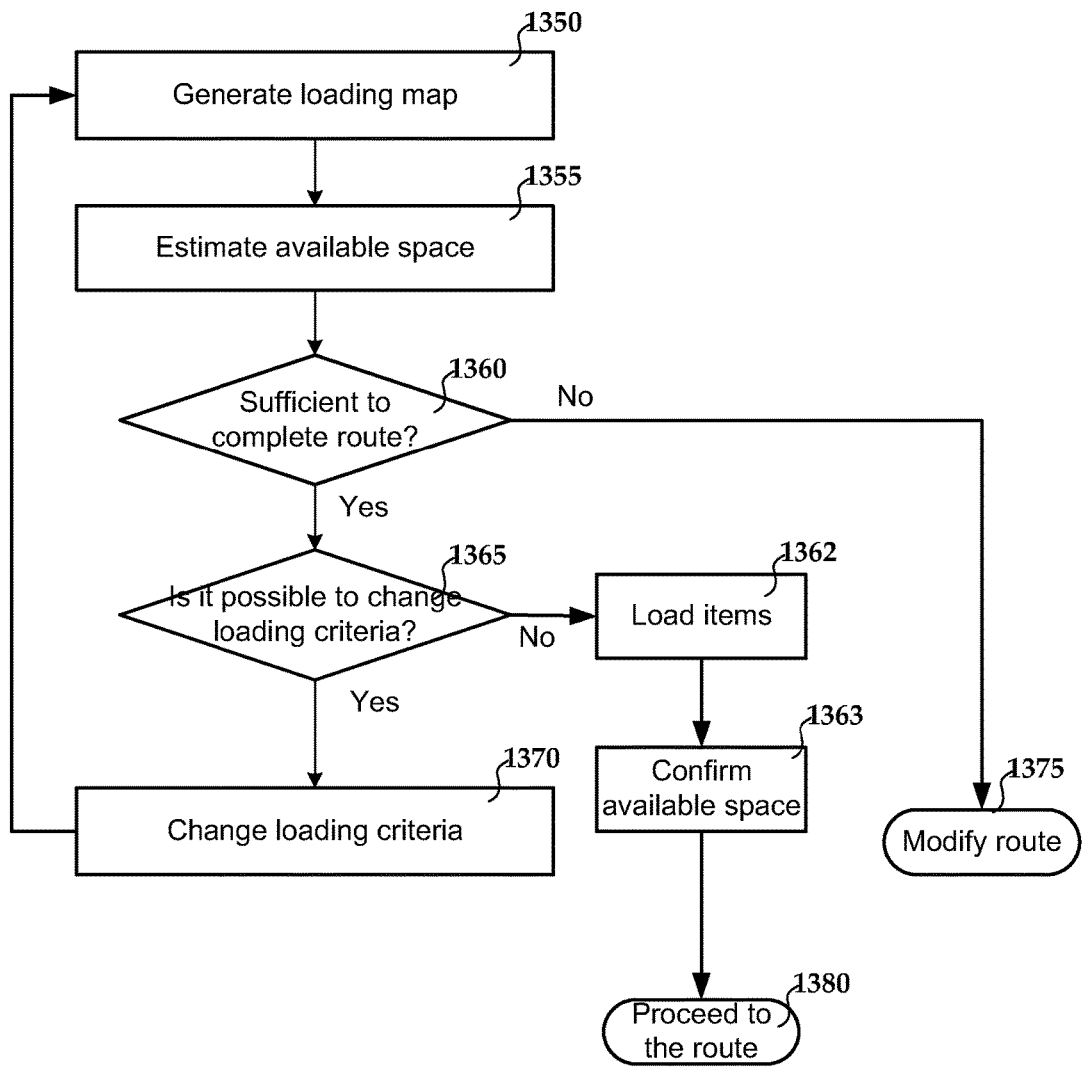
FIG. 13B is a flow diagram that shows a process of iteratively generating a loading map based on space efficiency and time efficiency.

In some implementations, the loading map may be iteratively generated according to time efficiency criteria and/or loading criteria (allowed orientation(s), fragility, value, etc.) to determine the available space. For example, the flow diagram of FIG. 13B shows a process of iteratively generating a loading map based on space efficiency and time efficiency. Space efficiency involves loading items in the trailer in a way that yields more available space. Time efficiency involves loading items in a trailer in a way that decreases the amount of time needed to load and/or unload items at stops along the route.

As illustrated in the flow diagram of FIG. 13B, initially a loading map that provides a high level of spatial efficiency without regard to time efficiency can be generated 1350. The available space in the trailer can be estimated 1355 based on the loading map. If the available space is insufficient to complete the route or to make the next pick up, the route is modified 1375.

If the available space is sufficient to complete the route or complete the next pickup, then the loading processor attempts to achieve a higher level of time efficiency of the loading map. The loading criteria are changed 1370 and a loading map is generated 1350 based on the changed loading criteria. The loading map can be generated 1350 multiple times until a map that accommodates both space and time efficiency of the route is identified. When it is no longer possible to change the loading criteria, e.g., because the modifications to the loading criteria have been exhausted and/or because the requested number of iterations have been performed, then the items can be loaded 1362 according to the plan. The available space estimated by the loading plan may be confirmed 1363 using captured images. The trailer proceeds 1380 to the next stop along the route.

In some embodiments, at least some of the processes 1350-1380 of flow diagram of FIG. 13B can be performed manually; in some embodiments, all of the processes 1350-1380 can be performed automatically; and in some embodiments, the processes 1350-1380 may be performed by a combination of manual and automatic techniques.

Figure 14:
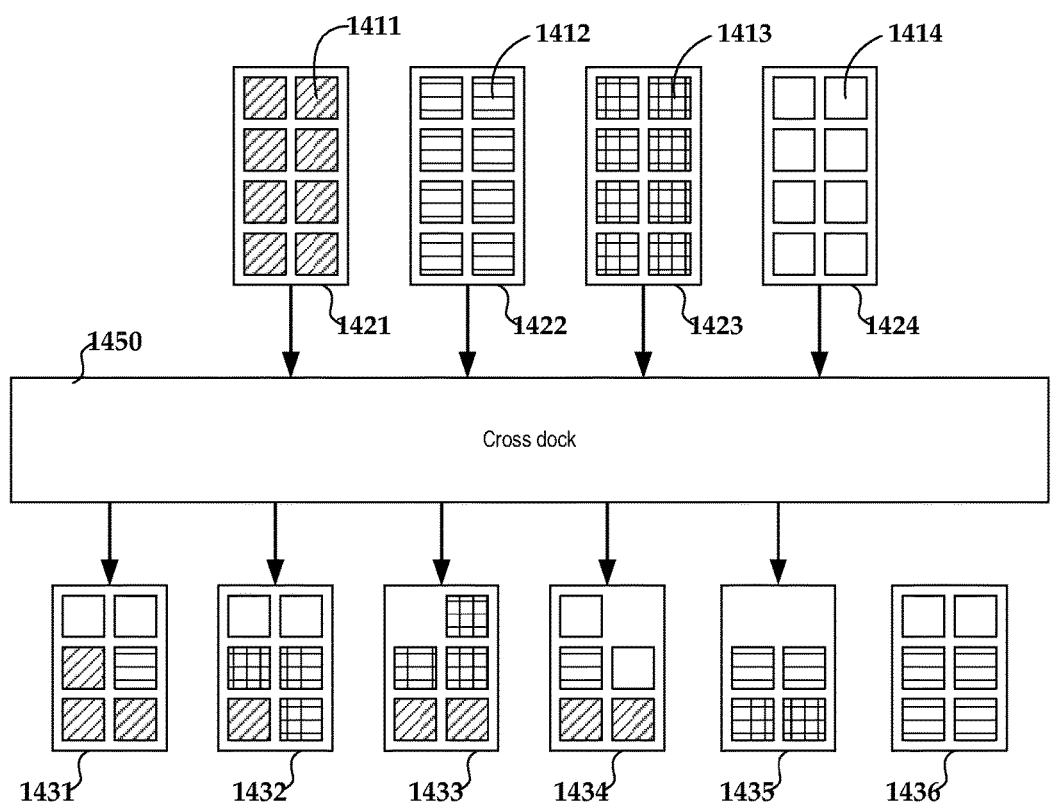
FIG. 14 conceptually illustrates cross-docking.

Some embodiments involve the use of captured images and image intelligence to facilitate cross-docking FIG. 14 illustrates the concept of cross-docking Cargo items 1411, 1412, 1413, 1414 arrive at the cross dock 1450 on four incoming trailers 1421, 1422, 1423, 1424, respectively. The cargo items 1411, 1412, 1413, 1414 are distributed among a six outgoing trailers 1431, 1432, 1433, 1434, 1435, 1436. Cross-docking involves unloading cargo from an incoming vehicle and distributing and loading the cargo directly to outbound vehicles with little or no storage time in between the loading and unloading. Incoming cargo items are unloaded and their end destinations are identified. The cargo items are then moved to the appropriate outgoing dock, e.g., via a forklift, conveyor belt, pallet truck, hand truck or another means. Cross-docking provides a central site for products to be sorted and similar products combined to be delivered to multiple destinations.

Figure 15:
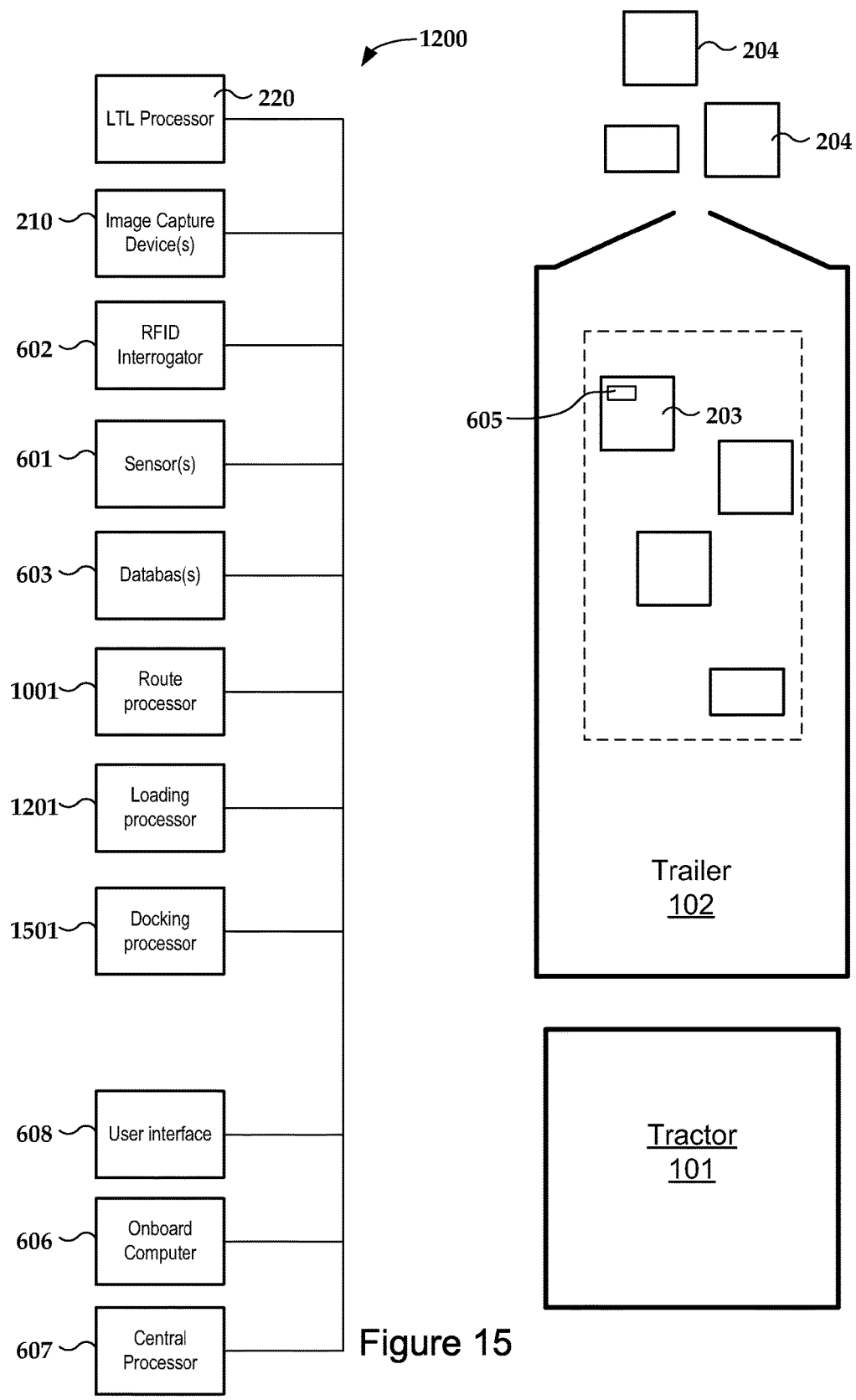
FIG. 15 is a block diagram of a system that includes an optional docking processor.

FIG. 15 shows a system that is similar in some respects to system 1200 of FIG. 12 and includes an optional docking processor 1502. As illustrated by the flow diagram of FIG. 16, images of the cargo items are captured by image capture devices 210. For example, in some embodiments, the images of the cargo items are captured 1610 as the cargo items are unloaded from one or more incoming trailers. The LTL processor 220 extracts 1620 information about the cargo items from the images and the dock processor generates 1630 a distribution plan for distributing the cargo items of the trailer to a plurality of outgoing trailers based on the information. In some embodiments, the information about the cargo items can be obtained directly from the images, such as the orientation information, dimensions, stacking information, hazmat information and the like. In some embodiments, the cargo items are labeled with an identification code, (e.g., see FIG. 7) and the docking processor can access a database using the identification codes to obtain information about the cargo item.

Figure 16:
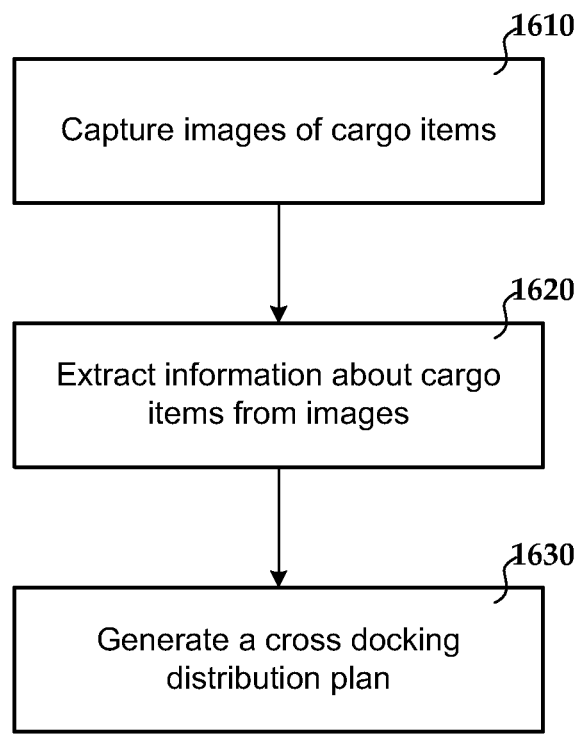
FIG. 16 is a flow diagram illustrating a method for performing cross-docking in accordance with some embodiments.

In some embodiments, at least some of the processes 1610-1630 of flow diagram of FIG. 16 can be performed manually; in some embodiments, all of the processes 1610-1630 can be performed automatically; and in some embodiments, the processes 1610-1630 may be performed by a combination of manual and automatic techniques.

The use of captured images as incoming trailers are unloaded can be used to streamline the distribution of cargo items from incoming to outgoing vehicles. The docking processor may control the distribution of cargo items from many incoming trailers to many outgoing trailers with little storage time. The docking processor can update the distribution plan in real time based on information about the order in which cargo items are being unloaded from the incoming trailers and/or the dimensions of the cargo items measured using the captured images. Additionally or alternatively, information about the cargo items being unloaded facilitates efficient distribution of dock resources. For example, if the LTL processor identifies heavy object is about to be unloaded, the docking processor may issue a request for a forklift, a crane or other equipment needed to move the cargo item. Thus, dock resources and/or personnel can be allocated to unload the incoming trailers in real time as cargo items are removed based on image intelligence.

Figure 17:
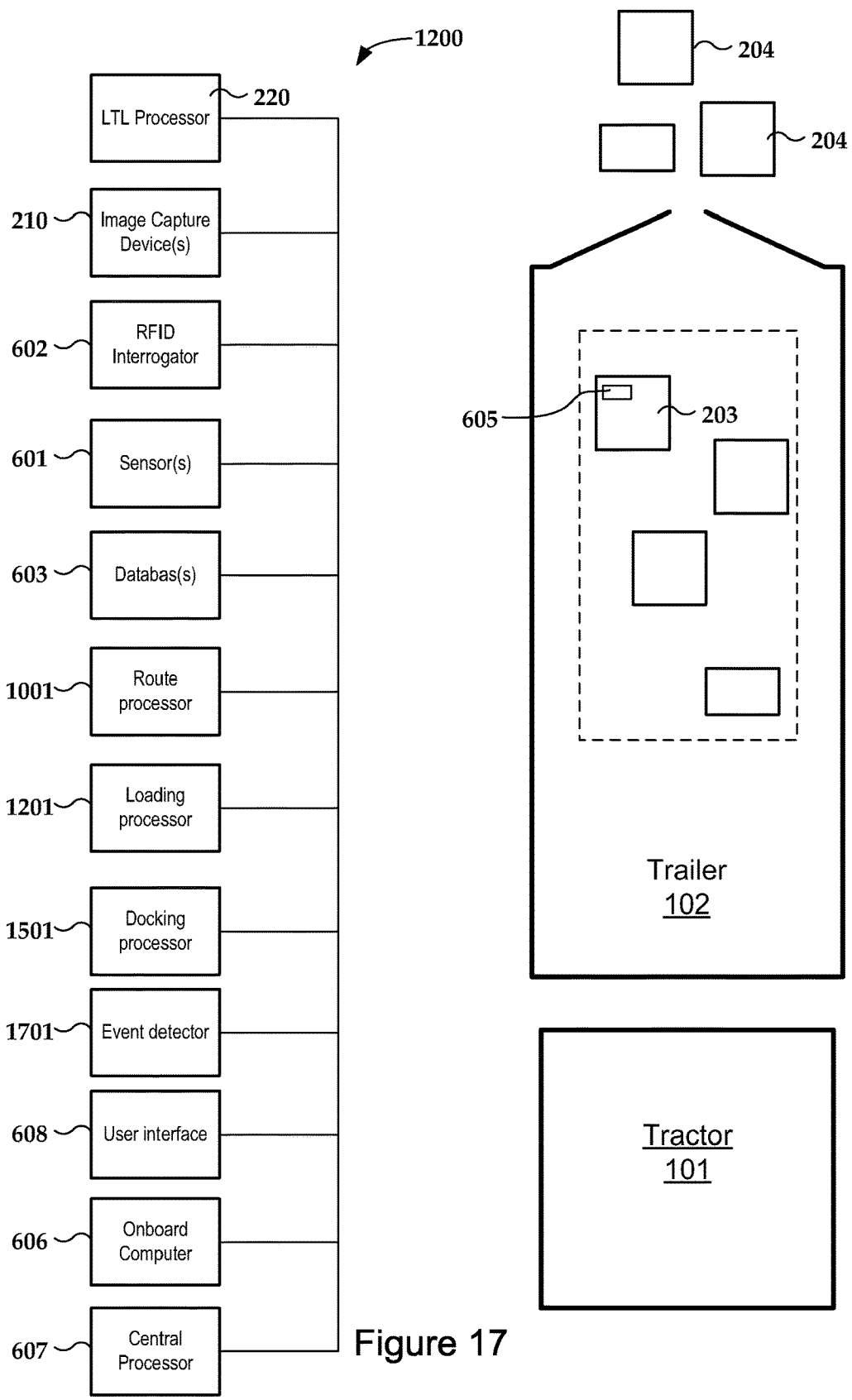
FIG. 17 shows a system that includes an optional event detector.

Some embodiments involve event detection during the loading and/or unloading process based on captured images. FIG. 17 shows a system that is similar in some respects to system 1500 of FIG. 15 and includes an optional event detector 1701. Image capture devices disposed on the tractor 101, trailer 102, or on the loading dock can be processed by the event detector to detect anomalous loading/unloading events. In some embodiments, the images capture devices can be used in conjunction with other sensors and devices, e.g., accelerometers attached to the packaging, RFID tags, etc.

In some embodiments, the event detector 1701 may analyze images captured during loading/unloading processes to detect destination errors for items loaded on a trailer. These destination errors occur when loaded items have a destination not associated with the route of the trailer. In some embodiments, the erroneously loaded items may be detected based on the images of the destination printed on the cargo item label. If the route of the trailer is not associated with the destination of the printed label, a loading event is flagged.

In some embodiments, the event detector 1701 may analyze images to detect errors in cargo loading, e.g., cargo items that are not oriented correctly, stacking or weight limits exceeded, etc. The event detector 1701 may compare the characteristics of the cargo items, e.g., allowed orientation(s), indicated on the cargo item label and/or obtained from the database to the placement during loading. If the placement does not match the indicated loading placement, a loading event is flagged.

Loading events can be recorded by a media recorder to preserve a record of the event. Additionally or alternatively, an alert can be generated and sent to the operator loading the vehicle and/or other personnel.

Systems, devices, or methods disclosed herein may include one or more of the features, structures, methods, or combinations thereof described herein. For example, a device or method may be implemented to include one or more of the features and/or processes described herein. It is intended that such device or method need not include all of the features and/or processes described herein, but may be implemented to include selected features and/or processes that provide useful structures and/or functionality. The systems described herein may be implemented in any combination of hardware, software, and firmware. Communication between various components of the systems, e.g., systems 100, 1000, 1200, 1500, 1700 can be accomplished over wireless or wired communication channels.

The foregoing description of various embodiments has been presented for the purposes of illustration and description and not limitation. The embodiments disclosed are not intended to be exhaustive or to limit the possible implementations to the embodiments disclosed. Many modifications and variations are possible in light of the above teaching.

What is claimed is:

1. A system for use with a vehicle comprising a tractor and a trailer, the system comprising: one or more image capture devices, each image capture device configured to capture images of one or both of: an interior of a trailer; and cargo items of the trailer; and an image processor configured to estimate an amount of available cargo space within the trailer based on the images, wherein the amount of available cargo space within the trailer comprises a plurality of different types of available cargo space associated with different cargo item characteristics, and the image processor is configured to determine amounts of the different types of available cargo space; wherein the image processor is configured to identify a plurality of different types of available cargo space comprising a plurality of: cargo space available for fragile items; cargo space available for valuable items; cargo space available taking into account allowed stacking limits; cargo space available for items that can be placed on bottom, middle, top; cargo space available based on trailer weight loading criteria; cargo space available based on dimensions or shape: cargo space available taking into account delivery priorities and stops along a route; cargo space available taking into account pack together instructions; cargo space available taking into account allowed orientations; and cargo space available based on weight.

2. The system of claim 1, wherein the one or more image capture devices comprise one or more of:
a video camera;
a still camera;
an optical scanner;
an infrared scanner; and
a laser scanner.

3. The system of claim 1, wherein some or all of the one or more image capture devices are configured to be positioned inside the trailer, outside the trailer, or on a loading dock.

4. The system of claim 1, wherein:
the images include one or both of 2D images and 3D images; and
the system further comprises a user interface including a display coupled to the image processor and configured to display the images to an operator.

5. The system of claim 1, wherein the image processor is part of an onboard computer of the tractor.

6. The system of claim 5, wherein the onboard computer is configured to provide information about the amount of available cargo space and the amounts of the different types of available cargo space to a transportation management system.

7. The system of claim 1, further comprising one or more graduation marks at the trailer, wherein at least some of the image capture devices are positioned to capture an image of the graduation marks.

8. The system of claim 1, wherein the image processor is configured to one or more of:
measure unoccupied space shown in the images to determine the amount of available space;
measure occupied space shown in the images to determine the amount of available space; and
measure dimensions of the cargo items shown in the images to determine the amount of available space.

9. The system of claim 1, wherein:
the image processor is configured to detect an identification mark on a cargo item and to identify the cargo item using the identification mark; and
the identification mark comprises one or both of a bar code and an alphanumeric code.

10. The system of claim 1, further comprising a routing processor configured to one or more of:
determine at least one cargo stop for the vehicle based on the amounts of the different types of available cargo space;
modify a previous route for the vehicle based on the amounts of the different types of available cargo space;
compare the amounts of the different types of available space with a required space of cargo items at a next pick up location and to determine if the required space exceeds the amounts of different types of available cargo space; and
modify a route of the vehicle if the required space exceeds the amounts of the different types of available cargo space.

11. The system of claim 1, further comprising a loading processor configured to one or more of:
generate a loading map that includes a position for each cargo item based on dimensions the cargo items;
update the loading map based on the dimensions of the cargo items unloaded from the trailer and the dimensions of the cargo items subsequently loaded in the trailer; and
generate the loading map based on weight of each cargo item.

12. The system of claim 1, wherein the image processor is configured to determine characteristics for each cargo item using the captured images, the characteristics include one or more of:
allowed orientation information;
stacking limits;
fragility information;
hazmat information;
allowed position information;
value of the cargo item;
weight;
position information;
delivery priority;
customer preferences; and
cargo item set information.

13. The system of claim 1, further comprising a loading processor configured to generate a loading map comprising positions for each cargo item based on the characteristics plurality of different types of available cargo space.

14. The system of claim 1, wherein:
the image capture devices are configured to capture images of the cargo items of the trailer;
the image processor is configured to extract information about the cargo items from the images; and
the system further comprises a dock processor configured to generate a distribution plan for distributing the cargo items of the trailer to a number of secondary trailers based on the information, wherein the information comprises one or more of:
identification codes;
destinations;
dimensions;
allowed orientations;
stacking information;
fragility;
value;
weight;
temperature information;
hazmat information;
customer information; and
cargo item set information.

15. The system of claim 14, wherein the distribution plan takes into account an order of unloading the cargo items from the trailer.

16. The system of claim 14, wherein:
the image capture devices are configured to capture images of the cargo items of the trailer as the cargo items are unloaded from the trailer; and
the dock processor is configured to update the distribution plan in real time as the cargo items are unloaded from the trailer.

17. The system of claim 14, wherein the dock processor is configured to allocate dock resources based on the information.

18. The system of claim 1, further comprising an event detector configured to detect anomalous events that occur during at least one of unloading the cargo items and loading the cargo items.

19. A system for use with a vehicle comprising a tractor and a trailer, the system comprising: one or more image capture devices, each image capture device configured to capture images of cargo items of the trailer; an image processor configured to determine dimensions of the cargo items using the captured images, the image processor configured to estimate an amount of available cargo space within the trailer based on the captured images, wherein the amount of available cargo space within the trailer comprises a plurality of different types of available cargo space associated with different cargo item characteristics, and the image processor is configured to determine amounts of the different types of available cargo space; and a loading processor configured to generate a loading plan for the cargo items based on the dimensions of the cargo items and the plurality of different types of available cargo space; wherein the image processor is configured to identify a plurality of different types of available cargo space comprising a plurality of: cargo space available for fragile items; cargo space available for valuable items; cargo space available taking into account allowed stacking limits; cargo space available for items that can be placed on bottom, middle, top; cargo space available based on trailer weight loading criteria; cargo space available based on dimensions or shape: cargo space available taking into account delivery priorities and stops along a route; cargo space available taking into account pack together instructions; cargo space available taking into account allowed orientations; and cargo space available based on weight.

20. The system of claim 19, wherein the loading processor is configured to update the loading plan as the vehicle proceeds along a route.

21. A system for use with a vehicle comprising a tractor and a trailer, the system comprising: one or more image capture devices, each image capture device configured to capture images of cargo items as the cargo items are unloaded from the trailer; an image processor configured to determine characteristics of the cargo items as the cargo items are unloaded from the trailer using the captured images, the image processor configured to estimate an amount of available cargo space within the trailer based on the captured images, wherein the amount of available cargo space within the trailer comprises a plurality of different types of available cargo space associated with different cargo item characteristics, and the image processor is configured to determine amounts of the different types of available cargo space; and a docking processor configured to generate a cross-docking distribution plan for distributing the cargo items to a plurality of secondary trailers based on the characteristics; wherein the image processor is configured to identify a plurality of different types of available cargo space comprising a plurality of: cargo space available for fragile items; cargo space available for valuable items; cargo space available taking into account allowed stacking limits; cargo space available for items that can be placed on bottom, middle, top; cargo space available based on trailer weight loading criteria; cargo space available based on dimensions or shape: cargo space available taking into account delivery priorities and stops along a route; cargo space available taking into account pack together instructions; cargo space available taking into account allowed orientations; and cargo space available based on weight.

* * * * *